US009213210B2

(12) United States Patent
Andersson Ersman et al.

(10) Patent No.: US 9,213,210 B2
(45) Date of Patent: Dec. 15, 2015

(54) VERTICAL ELECTROCHROMIC DISPLAY

(71) Applicant: Acreo Swedish ICT AB, Kista (SE)

(72) Inventors: Peter Andersson Ersman, Finspang (SE); Mats Sandberg, Norrkoping (SE)

(73) Assignee: Acreo Swedish ICT AB, Kista (SE)

( * ) Notice: Subject to any disclaimer, the term of this patent is extended or adjusted under 35 U.S.C. 154(b) by 10 days.

(21) Appl. No.: 14/354,809

(22) PCT Filed: Oct. 5, 2012

(86) PCT No.: PCT/EP2012/069769
§ 371 (c)(1),
(2) Date: Apr. 28, 2014

(87) PCT Pub. No.: WO2013/068185
PCT Pub. Date: May 16, 2013

(65) Prior Publication Data
US 2014/0307302 A1  Oct. 16, 2014

Related U.S. Application Data

(60) Provisional application No. 61/556,457, filed on Nov. 7, 2011.

(30) Foreign Application Priority Data

Nov. 7, 2011 (EP) ..................................... 11188130

(51) Int. Cl.
*G02F 1/15* (2006.01)
*G02F 1/153* (2006.01)
(Continued)

(52) U.S. Cl.
CPC ...... *G02F 1/15* (2013.01); *G02F 1/155* (2013.01); *G02F 1/1533* (2013.01); *G02F 1/163* (2013.01);
(Continued)

(58) Field of Classification Search
CPC ......... G02F 1/15; G02F 1/155; G02F 1/1533; G02F 1/163
USPC .................................. 359/265–275; 345/105
See application file for complete search history.

(56) References Cited

U.S. PATENT DOCUMENTS 4,505,021 A * 3/1985 Hamada et al. ............... 29/25.03
9,013,777 B2 * 4/2015 Frey et al. ..................... 359/265
(Continued)

FOREIGN PATENT DOCUMENTS

JP         2010054597 A   3/2010
WO    WO-2008062149 A1   5/2008

OTHER PUBLICATIONS

James P. Coleman, "Printed, Flexible Electrochromic Displays Using Interdigitated Electrodes", Solar Energy Materials and Solar Cells, Elsevier Science Publishers, Amsterdam, NL, vol. 56, No. 3-4, Dec. 30, 1999, pp. 395-418, XP004154421, ISSN: 0927-0248, DOI: 10.1016/S0927-0248(98)00144-5.
(Continued)

*Primary Examiner* — Tuyen Tra
(74) *Attorney, Agent, or Firm* — Harness, Dickey & Pierce, P.L.C.

(57) ABSTRACT

A directly addressable display device comprising at least one pixel cell (1-9), each pixel cell (1-9) being arranged for displaying a symbol, which symbol is repeatedly switchable between an on-state and an off-state, wherein each pixel cell (1-9) comprises an electrochromic layer (110) comprising an electrochromic and electrochemically active organic polymer material being electrochemically switchable between two different visually detectable coloring states; a counter electrode layer (140) comprising an electronically conductive material, wherein said counter electrode layer (140) in the viewing direction of the display device is arranged behind said electrochromic layer (110); an electrolyte layer (130), which electrolyte layer (130) is solid and arranged spatially between, and in ionic contact with, said electrochromic layer (110) and said counter electrode layer (140); a symbol defining layer (120) which is electronically and ionically insulating, arranged in direct ionic contact with said electrochromic layer (110), and which comprises one or more openings (121-129) which encloses said electrolyte layer (130) and defines the shape of said symbols; wherein said electrolyte layer (130) comprises a composition comprising a polyelectrolyte selected from one or more cationic polymers, wherein the electrolyte is substantially free of small cations.

17 Claims, 8 Drawing Sheets

(51) Int. Cl.
    *G02F 1/155*    (2006.01)
    *G02F 1/163*    (2006.01)
    *G09F 9/302*    (2006.01)
(52) U.S. Cl.
    CPC ...... *G09F 9/3023* (2013.01); *G02F 2001/1519* (2013.01); *G02F 2001/1536* (2013.01); *G02F 2001/1555* (2013.01); *G02F 2001/1557* (2013.01)

(56) References Cited

U.S. PATENT DOCUMENTS

2009/0008031 A1    1/2009   Gould et al.
2009/0052006 A1    2/2009   Xu et al.
2010/0157409 A1    6/2010   Brabec et al.

OTHER PUBLICATIONS

International Search Report PCT/ISA/210 for International Application No. PCT/EP2012/069769 Dated on Oct. 5, 2012.

International Written Opinion PCT/ISA/237 for International Application No. PCT/EP2012/069769 Dated on Oct. 5, 2012.

* cited by examiner

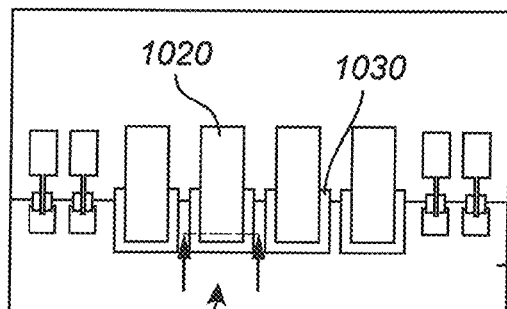
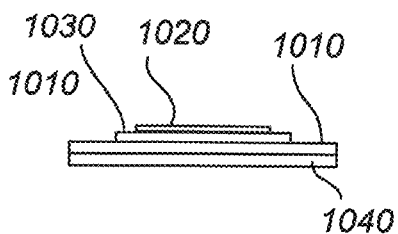
Fig. 8a  Fig. 8b
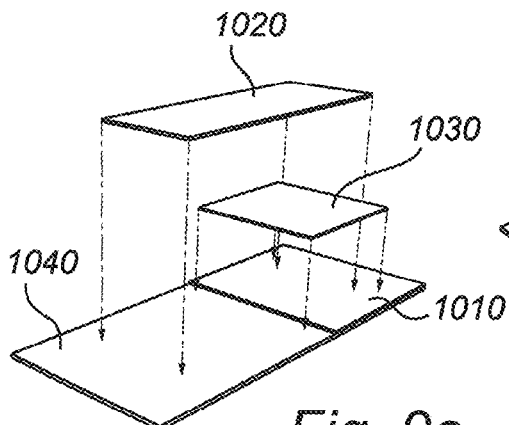
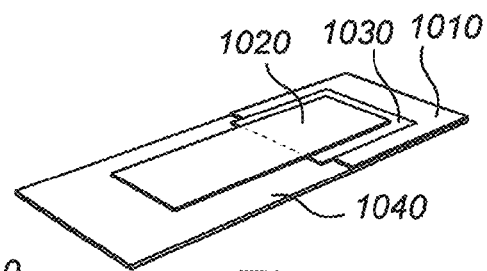
Fig. 9a  Fig. 9b
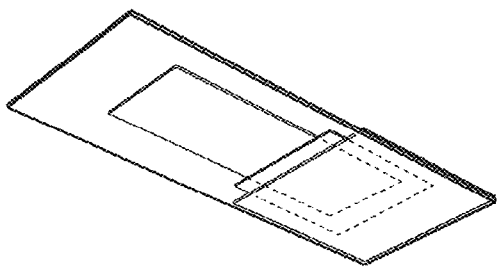
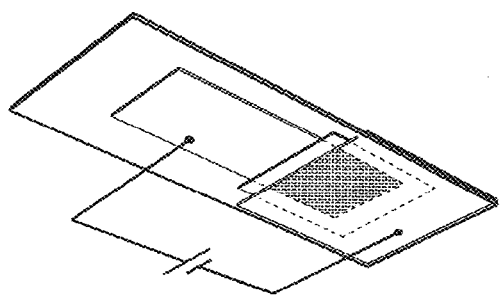
Fig. 9c  Fig. 9d

VERTICAL ELECTROCHROMIC DISPLAY

This application is a national phase under 35 U.S.C. §371 of PCT International Application No. PCT/EP2012/069769 which has an International filing date of Oct. 5, 2012, which claims priority to European patent application number EP 11188130.6 filed Nov. 7, 2011 and U.S. provisional patent application No. 61/556,457 filed Nov. 7, 2011.

FIELD OF THE INVENTION

The present invention relates to a directly addressed or directly addressable display device comprising an electrolyte in ionic contact with, and sandwiched between, an electrochromic layer and a counter electrode, wherein the display is arranged to change colour upon reduction of said electrochromic layer. The present invention further relates to the production and operation of such a display devices.

BACKGROUND ART

In directly addressed electrochromic displays or directly addressable electrochromic displays, each pixel is connected by a separate electric conduction line to an external drive voltage source, facilitating simultaneous individual electrical control of all pixels in the display. Furthermore, when operating a directly addressed electrochromic display, or directly addressable electrochromic display, it is possible to turn on, or initiating a switch of, all the pixels simultaneously. It should be noted that the expressions directly addressed and directly addressable are used interchangeably throughout the application, and both refer to a display device that is to be addressed by direct addressing. When the number of pixels in a display is large, it is either physically impossible or impractical to connect one separate line to each pixel. To overcome this problem the pixels are commonly arranged in a matrix structure in which they are addressed by time-multiplexing techniques via row and column lines from the matrix edges. Such displays and the methods of addressing them are denoted matrix displays and matrix addressing, respectively.

The switching of electrochromic electrode materials is a faradic reaction, that is, ions must be able to move into or out from the electrode to compensate for changes in oxidation levels of the electrode material. This also means that at least one ionic species in an electrolyte must be mobile in the electrode material. In electrochromic devices where the electrochromic electrode materials also serves as a conductor, providing a lead for current to a voltage source, the mobile ion can also migrate in the electrode material. This migration may result in a reduced sharpness of the colour switch as the area switched can extend from the area defined by the location of the counter electrode or by the location of the electrolyte.

WO 2008/062149 describes lateral electrochromic displays comprising PEDOT:PSS as electrochromic material, which are illustrated in e.g. FIGS. 1-3. In operation a voltage difference is applied between the two pixel portions which are bridged by electrolyte, as can be seen in FIG. 3. This voltage difference gives rise to a colouring of the electrochromic material, the colouring being initiated at a first edge of the electrochromic material at the gap between the two pixel portions. While the voltage is applied, the colouring spreads across the material and a boarder is formed between material that has switched colour and material that has not yet switched colour. It has been seen that the border between the switched and un-switched material is not always as sharp as may be desired, in order to be able to show e.g. symbols having more complex shapes.

An inherent problem when desiring to create sharp images or symbols by this or vertical type of displays originates from the fact that ions must be mobile in both the electrolyte and in the electrochromic material itself in order to give rise to the colour change. So, initially the colour change will be seen only at the area of the electrochromic material which is covered by electrolyte.

However, the ions will migrate both vertically and laterally in the electrochromic material, and thus also outside of the electrolyte covered area. This migration of the ions results in a blurring of the switched area, and thus also of the displayed symbol.

However, there is a need to find a way of producing directly addressed display devices, capable of displaying sharper images.

SUMMARY OF THE INVENTION

An object of the present invention is to overcome or alleviate the above mentioned drawbacks. These and other objects are met by the subject matters provided in the independent claims. Preferred embodiments of the invention are presented in the independent claims.

According to a first aspect thereof, the present invention provides a part for a directly addressed or directly addressable display device comprising at least one pixel cell, each one of said at least one pixel cell is arranged for displaying a symbol, which symbol is repeatedly switchable between an on-state and an off-state,
wherein each pixel cell comprises:
  an electrically conducting electrochromic layer comprising electrochromic and electrochemically active organic polymer material being electrochemically switchable between two different visually detectable colouring states;
  a counter electrode layer comprising an electronically conductive material, wherein said counter electrode layer in a viewing direction is arranged behind said electrochromic layer;
  an electrolyte layer, which electrolyte layer is solidified and arranged spatially between, and in ionic contact with, said electrochromic layer and said counter electrode layer;
wherein
  each pixel cell further comprises a symbol defining layer which is
electronically and ionically insulating, arranged in direct ionic contact with said electrochromic layer, and which symbol defining layer comprises one or more openings which encloses said electrolyte layer and defines the shape of said symbol;
  said electrolyte layer, between said symbol defining layer and said counter electrode layer, covers and extends to the side of said one or more openings of the symbol defining layer; and
  said electrolyte comprises a composition comprising:
a) a polyelectrolyte selected from one or more cationic polymers, wherein the electrolyte is substantially free of small cations.

The above described display device is advantageous as it provides a sharper image, compared to similar devices where a migration/diffusion of the cations is not restricted to the same extent.

In relation to this invention, an electrolyte or electrolyte composition which is substantially free of small cations normally comprises cations having a molecular weight distribution wherein less than 20 wt %, or less than 15 wt % or less than 10 wt % or less than 5 wt % or less than 3 wt % of the cations have a molecular weight lower than 1 000 g/mole. That is, more than 80 wt %, or more than 85 wt % or more than 90 wt % or more than 95 wt % or more than 97 wt % of the cations have a molecular weight higher than 1000 g/mole.

Further, according to one example the cations of the electrolyte composition has a molecular weight (Mw) between 10000 and 100000 g/mole and more preferably between 20000 and 75000 g/mole.

According to a second aspect thereof, the present invention provides a directly addressable display device comprising:
  a part for a directly addressable display device according to claim 1; and
  connectors arranged to receive a power supply;
wherein the counter electrode layer (140) of the part for a directly addressable display device is electrically connected by a separate electric conductor to said connectors arranged to receive said power supply to enable individual control of the potential applied to the counter electrode layer (140).

According to a third aspect thereof, the present invention provides a directly addressable display device comprising:
  a part for a directly addressable display device according to claim 1;
  an addressing circuit; and
  connectors arranged to receive a power supply, which connectors are electrically connected to said addressing circuit; and
wherein the counter electrode layer (140) of the part for a directly addressable display device is electrically connected by a separate electric conductor to the addressing circuit to enable individual control of the potential applied to the counter electrode layer (140).

According to one embodiment, the directly addressable display device according to said second or third aspect of the invention further comprises a power supply, which is electrically connected to said connectors arranged to receive a power supply. In other words, the connectors may e.g. be battery connectors, i.e. means arranged to receive and fasten a battery, or blade connectors arranged to receive fastening means electrically connected to a larger power supply (than a house hold battery), the list of connectors is non exhaustive as there are numerous ways to connect a power supply to an electrode, which are all well known to the man skilled in the art.

According to one example said second or third aspect of the invention the part for a directly addressed or directly addressable display device according to said first aspect, is attached to e.g. a circuit board comprising connectors for receiving a power supply and optionally an addressing circuit.

According to a fourth aspect thereof, the present invention provides a method of producing at least a part of a directly addressed or directly addressable display device arranged to selectively display at least one symbol, which symbol is repeatedly switchable between an off-state and an on-state, comprising the steps of:
  providing an electrochromic layer carried by a transparent plastic substrate, wherein said electrochromic layer comprises electrochromic and electrochemically active organic polymer material being electrochemically switchable between different visually detectable colouring states;
  selecting active portions of said electrochromic layer;
  providing an electrolyte solution;
  printing an electrolyte layer directly on said active portions of said electrochromic layer using an electrolyte composition, wherein each portion of the electrolyte layer which is arranged in ionic contact with one active portion of the electrochromic layer, and arranged spatially separated from a portion of the electrolyte which is in ionic contact with any other active portion of the electrochromic layer;
  printing a counter electrode layer on top of, and in direct ionic contact with, said electrolyte layer at each active portion of the electrochromic layer;
wherein said step of providing an electrolyte composition comprises providing an electrolyte composition comprising
a) a polyelectrolyte selected from one or more cationic polymers, wherein the electrolyte is substantially free of small cations,
b) a particulate phase forming a colloidal dispersion of the electrolyte composition,
c) a binder system forming a cross-linked network; and
wherein the step of selecting active portions of said electrochromic layer further comprises printing a symbol defining layer directly on said electrochromic layer, which symbol defining layer encloses said active portions of said electrochromic layer and defines the respective shape of said at least two symbols.

The above described production process is advantageous as it produces a part for a display device providing a sharper image, compared to similar devices where a migration and/or diffusion of the cations is not restricted to the same extent. The production process is also advantageous as it provides an inexpensive way for massproducing the display devices without having to invest in e.g. expensive clean room facilities.

According to a fifth aspect thereof, the invention relates to the use of an electrolyte and a symbol defining layer for confining the electrochemical reaction in a part for a directly addressed or directly addressable display device arranged as described in relation to said first aspect of the invention.

According to a sixth aspect thereof, the invention relates to the operation of a part for a directly addressed or directly addressable display device arranged as described in relation to said first aspect of the invention, comprising the step of providing an electric potential difference between said electrochromic layer and said counter electrode layer, which electric potential difference causes a colour switch of the electrochromic layer of the pixel cell upon reduction of said electrochromic layer.

For years the inventors have struggled to design a directly addressed display device having sharper pixels than those obtained so far. Many solutions have been attempted without success. A few of them are mentioned here: the application of an ion isolative foil between the electrolyte and the electrochromic layer, the application of a printable layer being substantially ionically isolative and arranged between the counter electrode and the electrolyte, modifications of the electrochromic layer etc.

In summary, the invention is based on an surprising insight by the inventors that by combining a polycationic electrolyte and a printable layer being sufficiently ionically isolative or ionically insulating, an all printable display device capable of displaying surprisingly sharp symbols or images can be obtained.

Without being bound to any particular theoretical explanation, the following is believed to be the reasons behind the improved results. It is believed by the inventors that an enhanced sharpness, especially at the border between the switchable display area (in direct electronic contact with the electrolyte layer) and the adjacent area (i.e. the background), is achieved by a prevention or at least suppression of ionic migration and/or diffusion in the electrochromic layer. This prevention of ionic migration and/or diffusion in the electrochromic layer is preferably achieved by arranging the electrolyte layer and the applied potentials such that the large type of ion-complexes are attracted towards, and possibly also entering, the electrochromic layer. Upon entering the electrochromic layer, it is thought that the large type of ion-complexes mainly penetrates along a vertical axis (i.e. an axis parallel with the viewing direction, or an axis orthogonal to the substrate surface through which the display is viewed) through the thickness of the electrochromic material, which typically is less than 10 µm. Lateral spreading of charges under the symbol defining layer and throughout the electrochromic material seem restricted, partly because of the vertical electric field and partly because of the size of the ion-complexes. However, even if lateral spreading might occur on a length scale of tens of micrometers, the colour contrast would still remain sharp to the human eye.

In addition to this, it also plausible that small polymerizable molecules, available in irradiation curable compositions forming the symbol defining layer, penetrate into the electrochromic material during printing, and become immobilized in the electrochromic matrix as they polymerizes upon curing, which in turn implies that diffusion of high molecular weight ions are further restricted in the electrochromic material in areas where the symbol defining layer is printed. In other words, the colour contrast is enhanced by applying a symbol defining layer, comprising e.g. lacquer and/or varnish and/or resin, which symbol defining layer outlines the area of contact between the electrolyte layer and the electrochromic layer.

In use an electric potential difference is arranged between the electrochromic layer and said counter electrode layers, which gives rise to an oxidation or reduction of the electrochromic layer. If the potential difference is arranged such that the electrochromic layer is coloured upon reduction, the electrolyte layer preferably comprises large cationic complexes and smaller anions.

Below is given more details of how different embodiments of the directly addressed display device may be arranged.

According to one embodiment, each counter electrode layer of each at least one pixel is connectable by a separate electric conductor to an external power supply, to enable individual control of the potential applied to each counter electrode layer. This is advantageous as it enables a simultaneous switch of all pixels in a simple manner. According to one embodiment, said at least one pixel cell may be free of any electrodes and/or electronic conductors arranged both in front of said one or more openings in the symbol defining layer and in front of said electrochromic layer as seen in the viewing direction. Furthermore, said at least one pixel cell may be free of any electrodes and/or electronic conductors arranged between the electrochromic layer and the symbol defining layer. This is advantageous as it provides a simpler manufacturing process. Further, additional electrodes and/or electronic conductors may impair the electrochemical reactions and/or give rise to electrochemically parasitic reactions, leakage currents and/or unwanted migration of ions.

According to one embodiment, said at least one pixel cell is free of any electrodes and/or electronic conductors arranged behind the counter electrodes as seen in the viewing direction. This is advantageous since such additional electrodes and/or electronic conductors may impair the electrochemical reactions and/or give rise to electrochemically parasitic reactions, leakage currents and/or unwanted migration of ions.

Furthermore, according to one embodiment the only electronic conductors that are arranged in front of, or behind, the openings in the symbol defining layer, as seen in the viewing direction, are the electrochromic layer and the counter electrode layer, respectively.

According to an alternative embodiment there are additional electrodes or electronic conductors, e.g. ITO, arranged in front of or behind the openings in the symbol defining layer as seen in the viewing direction.

According to one embodiment, the part for a directly addressed or directly addressable display comprises at least two pixel cells, and said electrolyte layer is ionically separated between adjacent pixel cells and said counter electrode layer is electronically separated between adjacent pixel cells. This is advantageous as it enables to display two symbols in the display independently of each other.

According to one embodiment, the electrochromic layer of the part for a directly addressed or directly addressable display device extends continuously between adjacent pixel cells. This is advantageous as it facilitates the manufacturing of the display due to that less processing steps are needed, as well as might improve the visual perception of the display as there are no interruptions marking the edges of the pixel cells.

According to one embodiment, the symbol defining layer of the part for a directly addressed or directly addressable display device is continuous and comprises openings forming said symbols. This is advantageous as it facilitates the manufacturing of the display due to that less processing steps are needed, as well as might improve the visual perception of the display as there are no interruptions marking the edges of the pixel cells.

According to one embodiment, the counter electrode layer of the part for a directly addressed or directly addressable display device comprises electrically conductive carbon. This is advantageous as it provides a longer life time as well as improved retention time of the display. The prolonged life time is believed to be due to the inertness of the carbon material, i.e. that it is not electrochemically over-oxidized as compared to counter electrodes comprising conducting polymers, e.g. PEDOT:PSS. The improved retention time is believed to be due to a built-in voltage between the electrode materials such that bleaching of a coloured display device by short-circuiting is insufficient. Hence, the retention time is increased and the opposite voltage polarity is required for the bleaching cycle.

According to one example, a ground potential is applied to the electrochromic layer at at least one point of the layer. Thus in use, an oxidation or reduction of the electrochromic layer for one pixel cell may be achieved by arranging a sufficient, non-zero, electric potential difference between the electrochromic layer and the counter electrode of one pixel cell. Another pixel cell can be prevented from reacting by disconnecting the counter electrode of this pixel, e.g. by physical disconnection or by using a high impedance state on the corresponding output of a addressing circuit. In other words, each pixel cell may be individually switched by oxidation or reduction of the electrochromic layer by applying a potential difference between the electrochromic layer and the counter electrode of the pixel cell of interest. For a pixel cell which has been subject to a colour-change due to an applied non-zero electrical potential difference between the electrochromic layer and the counter electrode, reversing the electric potential (i.e. applying a reversed potential difference of sufficient magnitude between the electrochromic layer and the counter electrode) will result in bleaching of the pixel cell.

According to one embodiment, the colour of the electrolyte layer and the colour of the symbol defining layer are substantially the same, such that a visual appearance of the display in the off state results in that the symbols to be displayed are less discernable compared to if the colour of the electrolyte layer and the colour of the symbol defining layer were substantially different. This is advantageous as it improves the visual appearance of the display in the off state, as the symbols to be displayed are less discernable compared to if the colour difference was greater. Moreover, the appearance of the colour of the electrolyte layer and the appearance of the colour of the symbol defining layer, as perceived by a normal viewer, is the same, or substantially the same, or close to the same, colour. In other words, the colour of the electrolyte layer and the colour of the symbol defining layer are perceived by a normal viewer as being the same, or close to the same, colour. For example, colours which may are perceived as being the same by a normal viewer may be different shades of the same colour or colours which are close to each other in a colour space. Hence light grey and grey may, as well as pale green and pale blue, be perceived as substantially the same colour.

According to one embodiment, the part for a directly addressed or directly addressable display device is a fixed image display device which is arranged to display at least two symbols having different shapes.

According to one embodiment, the step of printing a symbol defining layer in the method according to the third aspect of the invention, further comprises the step of providing a continuous symbol defining layer comprising openings forming said at least two symbols.

According to one embodiment, the step of printing an electrolyte layer in the method according to the third aspect of the invention, further comprises the step of printing the electrolyte layer between said symbol defining layer and said counter electrode layer such that the electrolyte layer covers and extends to the side of the one or more openings of the symbol defining layer.

Furthermore, the display device architecture according to the present invention allows for efficient and low cost manufacturing using conventional printing techniques and few layers. The symbol defining layer may give the interface between the electrochromic layer and electrolyte layer, and hence the displayed symbol, any shape, such as a square, triangle, circle, etc. It may also be arranged as a figurative symbol, such as a flower or trademark, or as one or several letters in any alphabet, or as one segment in a 7 segment or 14-segment display or as a signature, or as a combination of the above. The shape of said interface is not limited to the examples mentioned above, but is free to be given any shape or combination of shapes, preferably defined by the symbol defining layer.

Furthermore, the fixed image display device of the present invention advantageously enables efficient manufacturing using conventional printing techniques and equipment, such as screen printing, flexography, gravure, offset lithography and inkjet printing. In particular, low-cost printing which may be defined as manufacturing using conventional printing methods in normal regular ambient conditions, such as room temperature, is advantageously realized. Low-cost printing may e.g. comprise manufacturing in a temperature interval around room temperature of 15 to 30 degrees Celsius, such as between 10 and 60 degrees Celsius, or between 10 and 35 degrees Celsius or between 15 and 30 degrees Celsius. In other words, the arrangement or printing of one or several of the different layers of the display device is performed in a temperature interval around room temperature. The manufacturing may further comprise baking processes involving higher temperatures e.g. for increasing the speed of drying, settling and/or curing layers and segments of the fixed image display device, such as the electrolyte segments. In addition, low-cost printing manufacturing may further advantageously entail manufacturing, such as arrangement or printing of one or several of the different layers in normal pressure conditions, such about 100 kPa or 1 atm, or in pressure conditions between 80 kPa and 120 kPa, and in ambient air conditions. Hence, in low-cost printing manufacturing, expensive and cumbersome equipment and/or manufacturing conditions, such as vacuum and/or clean room facilities, or similar facilities, are not required or may be significantly reduced.

The vertical and pixelated architecture of the fixed image display device according to the present invention, further improves the display characteristics by improving colour contrast and sharpness of the fixed image to be displayed. In particular, the pixelated design, comprising separate and isolated pixelated electrolyte segments restricts the electrochemical reaction of each one to a specified area. Hence, undesired spreading effects, or migration, of electrochemical reaction of each active pixel into undesired regions, which would reduce image quality and sharpness is efficiently reduced. It is, in particular, the retention time of the image upon disconnecting the electric potential that is prolonged by the pixelated electrolyte segments.

According to one embodiment all materials, or all layers, forming the fixed image display device are flexible, such that the resulting fixed image display device is flexible, and/or rollable. In other words it may be repeatedly bent or rolled without breaking. When bending or rolling the device the radius of curvature may be less than e.g. half the length of the display area of the display device.

According to an exemplifying embodiment, the fixed image display device further comprises a transparent substrate which is arranged, in the viewing direction, in front of the electrochromic layer, wherein the substrate continuously covers the active area of electrochromic layer. The substrate advantageously protects the fixed image display device and improves its life time. The provision of a top layer may further facilitate efficient low-cost manufacturing wherein the top layer may be used as a carrier onto which the pixel layer is printed. In turn, the electrochromic layer may be made thinner which improves the switching properties of the display device.

In general, devices according to the invention are operated by applying an electric potential difference across the electrolyte, i.e. by applying a first potential to said electrochromic layer, and a second potential different from said first potential to said counter electrode layer, such that an electric field within said solidified electrolyte is created. The electric field initiates a reduction or oxidation of said electrochromic layer, which reaction causes a colour change of said electrochromic layer, provided that the potential is sustained long enough. In other words, the colour changed is caused by a potential difference across said electrolyte.

It is to be understood that the switching time or the colour change of the pixel device is in general determined by e.g.:
 the mobility of ions in the electrolyte, the higher the mobility the shorter the switching time;
 the magnitude of the ionic current in the electrolyte, which is determined both by the ion mobility in the electrolyte as well as the electrolyte volume;
 the choice of electrochemically active and/or electrochromic material;
 the volume of the electrochemically active and/or electrochromic material that needs to be reacted in order to alter the colour of the electrochromic material;
 the amplitude of the applied voltage; the higher the voltage the shorter the switching time, and vice versa.

Basically there is no limitation or restriction of the thickness of said electrochromic layer of the display device, but it may e.g. be between 0.1 µm and 7 µm, mainly due to manufacturing and flexibility point of views, where the chosen thickness depends on the desired device property; a thinner layer normally equals a shorter switching time of the pixel device, while a thicker layer normally equals in higher colour contrast. Moreover, the thickness of said counter electrode layer of the pixel device may in an embodiment be between 0.1 μm and 40 μm. When choosing the thickness of the layers the following may be kept in mind, a too thin counter electrode layer could degrade the colouring performance of said electrochromic layer and a too thick layer could reduce the bending resistance and/or the mechanical pressure resistance of the pixel device. Moreover, the thickness of said electrolyte layer of the display device may in an embodiment be between 1 μm and 20 μm, or between 1 μm and 100 μm. Normally, the thinner the layer becomes, the better the flexibility, but the contrast decreases at the same time. The thickness of each layer is measured along a viewing direction normal to the respective pixel layer. According to optional methods of providing the pixel layers, they may be provided by a number of conventional printing techniques, such as spin-coating, ink-jet printing, screen-printing, ionic self-assembled multilayer, aerosol-jet printing or bar-coating.

DEFINITIONS

Viewing direction: The viewing direction is the geometrical direction along which the viewer normally views the display. In other words the viewing direction is a direction referring to the origin of a geometrical axis extending from the viewer. In other words, the viewing direction coincides with the normal vector of the electrochromic layer. In more detail, the viewing direction runs from the viewer towards the front side of the display device.

Normal viewer: A normal viewer is a human observer with a perfectly normal colour vision as defined by a normally distributed population.

Part for a display device: In relation to this invention the term part for a display device, such as a part for a directly addressed or directly addressable display device, refers to a display device, which is or is not fully assembled. A fully assembled display device may comprise a power supply and/or an addressing circuit, such as a logic circuit and/or a micro controller; while in a not yet fully assembled display device optional addressing circuit and/or the power supply may still not have been connected to the part for the display device. Furthermore, the part for a directly addressed or directly addressable display device may or may not comprise connection means to the addressing circuit.

Power supply: A power supply may be small scale power supply such as e.g. a battery or a solar cell (e.g. a PV cell), or it may be a large scale power supply such as a linear DC power supply, or a mains voltage supply. If desired or appropriate the power supply may be connected to an AC/DC converter.

Dynamic image display device: a dynamic image display device comprises control means for displaying varying images on the same portion of the display, such that the displayed image may be changed.

Fixed image display: a fixed image display device is not arranged to varying images on the same portion of the display. Instead, the fixed image display device is arranged to, upon activation, display one single fixed image. This single fixed image may alternately be turned on and off, e.g. by means of a control electronics.

Off state: the off state of the device is when the power is turned off, and all pixels have substantially the same colour and appearance, i.e. a voltage applied across the display, if any, is not sufficiently high to cause a change in colour of the pixels of the display. Further, this colour of the pixels is referred to as the background colour of the display.

On state: the on state of the device is when the power is turned on and a subset of the pixels of the display has a colour which is substantially different from the background colour of the display. This colour is referred to as the motif colour of the display. The colour change of the pixels is initiated and progressed by a voltage difference being applied across the electrolyte layer.

Layer: according to one embodiment, the display device comprises "layers" of different materials. These layers can be continuous or discontinuous, and are preferably arranged on and carried by a plastic substrate. Further, the term layer normally encompass all of the same material in the same plane, regardless whether this material is discontinuous or interrupted in such a way as to form "islands" in the plane, which "islands" are isolated from each other. As stated above, one layer can be continuous and shared by more than one pixel cell. In other words, the display device may comprise a continuous layer forming e.g. the electrochromic layer in a plurality of said pixel cells. In yet other words, the electrochromic layers in a plurality of pixels cells may each be a separate portion of a continuous electrochromic layer. The opposite may also occur, i.e. that a layer is discontinuous between different pixel cells. In other words, this layer is isolated or spatially separated between two pixel cells.

Electrochromic layer: an "electrochromic layer" in relation to this invention is composed of one material or a combination of materials. The material(s) may be organic or inorganic, low molecular or polymeric. Such an electrochromic layer, independent of whether it is composed of one material or is an ensemble of more than one material, combines the following properties: at least one material is electrically conducting in at least one oxidation state, and at least one material is electrochromic, i.e. exhibits colour change as a result of electrochemical redox reactions within the material, such as e.g. a reduction reaction in the electrochromic layer. Optionally, the electrochromic layer may comprise an electrochemically active material.

Electrochemically active: an "electrochemically active" layer according to the present invention is a piece of a material having an electronic conductivity that can be electrochemically altered through change of the redox state of said material. Normally, at least a portion of an electrochemically active element is in ionic contact with an electrolyte, and the electrochemically active element may furthermore be integrated with an electrode, being composed of the same or different materials. The electrode may also be arranged on top of said electrochemically active material.

Electrochromic display: an "electrochromic display" is in relation to this invention a device comprising at least one electrochromic layer, which device is arranged such that a colour change of the electrochromic layer is visually detectable in reflection and/or in transmission.

Colour change: when reference is made to "colour change", this is also meant to include changes in optical density or reflectance, so that "colour change" for example takes into account changes from blue to red, blue to colourless, colourless to blue, dark green to light green, light blue to blue, grey to white or dark grey to light grey alike.

Sharpness: in relation to this invention, when sharpness of an image or symbol is discussed, this relates to how the image is perceived by a naked eye. The opposite to a sharp image is e.g. a blurred image, i.e. an image with poorly defined boundaries between colour switched areas and non-colour switched areas.

Pixel portion: In relation to this invention the pixel portion of an electrochromic layer is defined by the interface between the electrolyte and the electrochromic layer. In more detail, the pixel portion is the volume of an electrochromic layer, which on its one side is covered by electrolyte. When a potential is applied to the electrochromic layer, the colour change of the layer might not correspond exactly to the extension of the interface between the electrolyte and the electrochromic layer, i.e. to what is defined as the pixel portion. The colour change might e.g. spread outside the interface between the electrolyte and the electrochromic layer, as well as through the electrochromic layer to the side opposite the one covered by electrolyte.

Electrodes: The electrodes or counter electrodes may comprise any electron conducting material, such as electrically conducting polymers, metal, conducting carbon, titanium, platinum, graphite, graphene, noble metals and inert metals or combinations of such electron conductive materials. The electrodes may further comprise electrochemically inert metals such as gold or other conducting materials suitable for being in contact with electrochemically active layers. Normally, conducting material suitable for being in contact with electrochemically active layers is inert such that they do not give rise to substantial electrochemical reactions. These materials may e.g. be provided as an ink or paste which is arranged on said insulating film during a manufacturing, or pre-manufacturing process.

The electrodes are preferably elongated and may for example be band shaped or arranged as threads or thread shaped. The electrodes may for example be arranged of a layer of conductive polymers or arranged of metal threads or lines. Further, the electrodes may be arranged in straight parallel lines but may also be curved and have irregular shapes. In other words, the pixel cells which are arranged in a matrix are not necessarily arranged in straight rows and columns, but may be arranged in a more irregular way, as long as each electrode is electronically isolated from the other pixel cell electrodes.

Electronic conductor: in relation to this invention electronic conductor bears the same meaning as electrode.

Electric conductor: in relation to the invention an electric conductor is a structure which can conduct electrons and/or ions. An electric conductor may be equal to an electrode or electronic conductor; or be a pure ionic conductor. An electric conductor may also comprise two sequentially arranged portions, wherein one of the portions is arranged to solely or mainly conduct ions, and the other portion is arranged to solely or mainly conduct electrons. An electric conductor may also comprise several alternating ionically and electronically conductive portions. In other words, an electric conductor in direct contact with a voltage supply in one end, and one of the counter electrodes in the other end may be used to apply a potential to the counter electrode.

Symbol defining layer: The symbol defining layer is electrically insulating, and have a low permeability for water and ionic species. The symbol defining layer is formed by printing a suitable composition forming the layer after curing. The printable composition may be curable by irradiation or by solvent evaporation, it may be transparent or opaque and it may be colourless or coloured. Examples of materials used for the symbol defining layer with substantially electrically and ionically insulating properties are solvent based printing inks or varnishes, e.g. Plastijet XG 383, a varnish, or Plastijet XG025, a white opaque printing ink, both sold by Fujifilm Sericol Ltd. In addition a range of lacquers, varnishes and resins can be used in the invention. Such resins or lacquers can be based on shellac, alkyd resins, polyvinylacetate, polyvinylbutyral, polyvinylchloride, polystyrene, polyesters and low molecular polyolefins. Further examples are UV curable dielectric 5018A purchased from DuPont, Uviplast UV curing ink Omniplus UL-025 from Fujifilm Sericol, Ultragraph UVAR from Marabu Printing Inks. The list is non exhaustive as there many other suitable materials available.

Substantially electrically and ionically isolative: It should be understood that the phrasing where a material is substantially electrically and ionically isolative is indicating that the material is close to fully, or fully, electrically and ionically insulating. Thus, the wording isolative and insulating are used interchangeably throughout the application. For a material being substantially electrically and ionically isolative, or electrically and ionically insulating, no, or very few, electrons or ions are permitted to pass through the material. Examples of materials for the symbol defining layer providing a substantially electrically and ionically isolation/insulation are given in the section just preceding this one, the list is non exhaustive. Irradiation curable printing compositions for the symbol defining layer can be chosen among commercial printing inks and printable varnishes such as Electrodag PD-011 B™ from Henkel GmbH, UVIJET Omniplus UL-025 from Fujifilm Sericol Ltd., DuPont 5018A, a clear varnish from DuPont, Ultragraph UVAR från Spacio. Further, monomers and other compounds may be added to modify the surface tension of the commercial inks to give a symbol defining layer with good coverage and with few pin-holes.

Irradiation curable printing compositions for the symbol defining layer can also be prepared from a suitable blend of polymerizable molecules, photo-initiators and agents for controlling wetting, flow and rheology of the composition. Polymerizable molecules could be of the type polymerizing by a radical mechanism such as acrylates, methacrylates, acrylamides and other vinyl compounds. The polymerizable molecules could contain one, two, or more polymerizable groups.

Radical Polymerizable Molecules

Monofunctional Monomers

Among the (meth)acrylate monomers that can be utilized in this invention are, for example, the acrylaytes: Among the (meth)acrylate monomers that can be utilized in this invention are, for example, the acrylaytes: isoamyl-, stearyl-, lauryl-, octyl-, decyl-, isomyristyl-, isostearyl-, 2-ethylhexyl diglycol-, 2-hydroxybutyl-, butoxyethyl-, ethoxydiethylene glycol-, methoxydiethylene glycol-, methoxypolyethylene glycol-, methoxypropylene glycol-, phenoxethyl-, tetrahydrofurfuryl-, isobornyl-, 2-hydroxyethyl-, 2-hydroxypropyl-, 2-hydroxy-3-phenoxypropyl-, and t-butylcycohexyl acrylate.

Difunctional Monomers

D-functional (meth)acrylates that can function in the invention are, for example triethylene glycol-, tetraethylene glycol-, polyethylene glycol-, tripropylene glycol-, polypropylene glycol-, 1,4-butanediol-, 1,6-hexanediol-, 1,9-nonanediol-, neopentylglycol-, dimethyloltricyclodecane-, neopentylglycol- and polytetramethylene glycol diacrylate.

Polyfunctional Monomers

Among polyfunctional (meth)acrylates the following can be used in the invention, di(trimethylolpropane)tetraacrylate, pentaerythritol triacrylate, pentaerythritol tetraacrylate, trimethylolpropane ethoxylate triacrylate, trimethylolpropane propoxylate triacrylate, trimethylolpropane trimethacrylate, tris[2-(acryloyloxy)ethyl]isocyanurate, and 1,3,5-Triacryloylhexahydro-1,3,5-triazine.

Photoinitiators are molecules decomposing to generate radical species that can initiate a polymerization reaction upon irradiation. Radical generating photoinitiators can be of the type aryl ketones, such as diaryl ketones, benzoquinone for example, monoarylketones, such as 1-Hydroxy-Cyclohexyl Phenyl Ketone (Irgacure™ 184) and its derivatives, benzyl- and benzoin compounds, thioxanthones, benzoquinones, such as anthraquinone derivatives, phoshineoxides, such as diphenyl(2,4,6-trimethylbenzoyl)phosphine oxide, (Lucerin™ TPO), or thioxanthones such as ITX0.

Printing compositions for the symbol defining layer curing by solvent evaporation can be chosen among commercial printing inks. Examples of solvent based printing inks or varnishes that can be applied in the inventions are Plastijet XG 383, a varnish, or Plastijet XG025, a white opaque printing ink, both sold by Fujifilm Sericol Ltd.

In addition a range of lacquers, varnishes and resins can be used in the invention. Such resins or lacquers can be based on shellac, alkyd resins, polyvinylacetate, polyvinylbutyral, polyvinylchloride, polystyrene, polyesters and low molecular polyolefins.

In more detail, the insulating material is provided in the intermediate regions between the electrolyte segments and the electrochromic pixel layer in order to prevent short-circuits, while openings in the insulating material allow for an ionic contact between the electrolyte segments and the electrochromic pixel layer, hence, the shape of the openings define the image of the display device. The insulating material is preferably processable from solution, such that printing or coating techniques can be used for the deposition of the symbol defining layer, e.g. screen printing, inkjet printing, aerosol-jet printing, flexo printing, gravure printing, offset printing, bar-coating. Solidification, or curing, of the insulating layer after the deposition is preferably performed by a cross-linking reaction initiated by exposure to ultra-violet light or by thermal means. From an aesthetic point of view, in order to improve the colour contrast, the insulating material perceived as the background is preferably perceived having the same colour as the superimposed colour of the electrochromic pixel layer and the electrolyte layer.

Direct electrical contact: Direct physical contact (common interface) between two phases (for example between electrochemically active organic material and electrolyte) that allows for the exchange of charges through the interface. Charge exchange through the interface can comprise transfer of electrons between electrically conducting phases, transfer of ions between ionically conducting phases, or conversion between electronic current and ionic current by means of electrochemistry at an interface between for example counter element and electrolyte or electrolyte and electrochromic element, or by occurrence of capacitive currents due to the charging of the Helmholtz layer at such an interface.

Ionic contact between two elements is provided by at least one material capable of transporting ions between the two elements. An electrolyte, in direct contact (common interface) with a first and a second electrochemically active layer, is one example of a material which may provide ionic contact between the two electrochemically active layers. The electrolyte may hence be referred to as being in ionic contact with the two electrochemically active layers.

Two materials may be in electronic contact with each other, e.g. via a third material. Electronic contact between two elements is provided by at least one material capable of transporting electrons between the two elements. A layer of carbon, in direct contact (common interface) with a first and a second electrochemically active layer, is one example of a material which may provide electronic contact between the two layers. The layer of carbon may hence be referred to as an electronic conductor, or electronically conductive.

Direct physical contact: Common interface between two materials or layers.

The electrochromic display device may comprise, as electrochromic material and/or electrochemically active material, a polymer which is electrically conducting in at least one oxidation state, and optionally also comprises a polyanion compound.

Electrochromic polymers for use in the electrochromic display device of the invention are for example selected from the group consisting of electrochromic polythiophenes, electrochromic polypyrroles, electrochromic polyanilines, electrochromic polyisothianaphthalenes, electrochromic polyphenylene vinylenes and copolymers thereof. In an embodiment, the electrochromic polymer is a homopolymer or copolymer of a 3,4-dialkoxythiophene, in which said two alkoxy groups may be the same or different or together represent an optionally substituted oxy-alkylene-oxy bridge. In yet an embodiment, the electrochromic polymer is a homopolymer or copolymer of a 3,4-dial koxythiophene selected from the group consisting of poly(3,4-methylenedioxythiophene), poly(3,4-methylenedioxythiophene) derivatives, poly(3,4-ethylenedioxythiophene), poly(3,4-ethylenedioxythiophene) derivatives, poly(3,4-propylenedioxythiophene), poly(3,4-propylenedioxythiophene) derivatives, poly(3,4-butylenedioxythiophene), poly(3,4-butylenedioxythiophene) derivatives, and copolymers therewith. The polyanion compound is then preferably poly (styrene sulfonate).

As is readily appreciated by the skilled man, in alternative embodiments of the invention, the electrochromic material comprises any non-polymer material, combination of different non-polymer materials, or combination of polymer materials with non-polymer materials, which exhibit conductivity in at least one oxidation state as well as electrochromic behaviour. For example, one could use a composite of an electrically conducting material and an electrochromic material, such as electrically conductive particles such as tin oxide, ITO or ATO particles with polymer or non-polymer electrochromic materials such as polyaniline, polypyrrole, polythiophene, nickel oxide, polyvinylferrocene, polyviologen, tungsten oxide, iridium oxide, molybdenum oxide and Prussian blue (ferric ferrocyanide). As non-limiting examples of electrochromic elements for use in the device of the invention, mention can be made of: a piece of PEDOT-PSS, being electrochromic as well as both electrically and ionically conducting; a piece of PEDOT-PSS with $Fe2+/SCN-$, PEDOT-PSS being conducting and electrochromic as mentioned above and $Fe2+/SCN-$ being an additional electrochromic component (see below); a piece composed of a continuous network of conducting ITO particles in an insulating polymeric matrix, in direct electrical contact with an electrochromic WO3-coating; a piece composed of a continuous network of conducting ITO particles in an insulating polymeric matrix, in contact with an electrochromic component dissolved in an electrolyte. As described above, an electrochromic display device may comprise a further electrochromic material for realization of displays with more than one colour. This further electrochromic material can be provided within the electrochromic pixel element or the solidified electrolyte, which then for example comprises an electrochromic redox system, such as the redox pair of colourless $Fe2+$ and $SCN-$ ions on one hand, and of red $Fe3+$ $(SCN)(H2O)5$ complex on the other. By way of further, non-limiting example, such materials may be selected from different phenazines such as DMPA—5,10-dihydro-5,10-dimethylphenazine, DEPA—5, 10-dihydro-5,10-diethylphenazine and DOPA—5,10-dihydro-5,10-dioctylphenazine, from TMPD—N,N,N',N'-tetramethylphenylenediamine, TMBZ—N,N,N',N'-tetramethylbenzidine, TTF—tetrathiafulvalene, phenanthroline-iron complexes, erioglaucin A, diphenylamines, p-ethoxychrysoidine, methylene blue, different indigos and phenosafranines, as well as mixtures thereof.

Solidified electrolyte: for the purposes of the invention, "solidified electrolyte" means an electrolyte, which at the temperatures at which it is used is sufficiently rigid that particles/flakes in the bulk therein are substantially immobilized by the high viscosity/rigidity of the electrolyte and that it does not flow or leak. In the preferred case, such an electrolyte has the proper rheological properties to allow for application of this material on a support in an integral sheet or in a pattern, for example by conventional printing methods. After deposition, the electrolyte formulation should solidify upon evaporation of solvent or because of a chemical cross-linking reaction, brought about by additional chemical reagents or by physical effect, such as irradiation by ultraviolet, infrared or microwave radiation, cooling or any other such. The solidified electrolyte may for example comprise an aqueous or organic solvent-containing gel, such as gelatine or a polymeric gel. However, solid polymeric electrolytes are also contemplated and fall within the scope of the present invention. Furthermore, the definition also encompasses liquid electrolyte solutions soaked into, or in any other way hosted by, an appropriate matrix material, such as a paper, a fabric or a porous polymer. In some embodiments of the invention, this material is in fact the support upon which the electrochromic device is arranged, so that the support forms an integral part of the operation of the electrochromic device.

Examples of opacifiers that may be used in the electrolyte are: Titanium dioxide, Zinc oxide, Zirconium oxide, Cadmium sulfide, Cadmium selenide, Sodium aluminosilicate, Chromium (III) oxide, Carbon black.

The electrolyte preferably has reological properties or a viscosity which makes it suitable for printing e.g. by ink-jet printing or by a roll-to-roll process. Exemplifying intervals of electrolyte viscosity (mPas) for different printing methods are:
Inkjet printing: 1-20
Flexo printing: 20-400
Screen printing: 1000-100000
Offset printing: 1000-100000
Gravure printing: 20-200.

In all embodiments of the invention, the colouring of each pixel is provided by a change in redox state of said electrochromic and electrochemically active organic polymer material, which causes a change of colour of the electrochromic material In other words, the electrolyte is normally free of colorants such as pH dyes, i.e. dyes which changes colour in response to the surrounding pH. In yet other words, the colour of the electrolyte normally remains unchanged or substantially unchanged during a colour switching of the pixel. In yet other words, the colour of the electrolyte is non-switchable, i.e. the colour of the electrolyte remains the same or remains substantially the same when a voltage is applied across the display sufficiently long for at least causing a colour switch, or colour change, of said first pixel layer. In addition to what has been stated with respect to the electrolyte being free of colorants, which changes colour when a potential difference is applied between said electrochromic layer and second counter electrode layers, the electrolyte may comprise colorants or opacifiers for reducing the transparency of the electrolyte. The opacifiers normally do not change colour when a voltage difference is applied between the first and second pixel layer. I.e. the colour of the opacifiers normally remains the same or substantially the same.

Furthermore, in each pixel cell said electrochromic layer and said counter electrode layer are ionically connected and electronically isolated, or substantially electronically isolated, from each other by at least one layer being arranged between said first and second pixel layer, wherein the at least one layer comprises the electrolyte layer. According to one embodiment the electrolyte layer is ionically conductive and electronically isolative/insulating, or substantially electronically isolative/insulating, i.e. the electrolyte layer does not transport electrons to any substantial extent. If the third electrode layer were not substantially electronically isolative/insulating, this material would cause an electronic short circuit of the device, which would normally prevent or at least impair a colour change of the electrochromic layer.

In summary, the material selection and the vertical architectural configuration of the display device according to the present invention allow for a manufacturing process comprising conventional printing techniques. Such conventional printing techniques may encompass bar coating, screen printing, spin-coating, ink-jet printing, aerosol-jet printing, or any other such manufacturing procedure. The architecture of the display device also allow for use of manufacturing procedures that are easily scalable to larger scale manufacturing, which, in turn, allow for faster and low price manufacturing. For example, a display arrangement comprising a plurality of display devices according to the present invention may be manufactured in a roll-to-roll manufacturing procedure.

The layers of the display device are advantageously provided on the substrate by means of printing techniques. In order to be printable, the materials should preferably have suitable rheological properties. Inks comprising electrically conductive polymers or conducting carbon are examples of such printable materials. There is a number of different suitable printing techniques, such as bar-coating, screen-printing, inkjet printing, aerosol-jet printing, spin-coating etc.

Generally, other objectives, features, and advantages of the present invention will appear from the following detailed disclosure, from the attached dependent claims as well as from the drawings. Embodiments of the invention will now be described, by way of example, with reference to the accompanying drawings. It should be understood that the drawings are not true to scale and, as is readily appreciated by a person skilled in the art, dimensions other than those illustrated in the drawings are equally possible within the scope of the invention.

BRIEF DESCRIPTION OF DRAWINGS

Embodiments of the invention will now be described, by way of example, with reference to the accompanying drawings, wherein:

FIGS. 1a and 1c.

FIG. 8a is a drawing of the electrochromic test-structures (1001) printed as described in example 7 below. The first electrode (1010), the second electrode (1020) and the electrolyte (1030), and the substrate (1040) is shown in the drawing.

FIG. 8b illustrates the electrochemical cell of the electrochromic test-structure as a schematic side view.

FIGS. 9a-9d illustrates a test pixel to be cut out from the test-structure depicted in FIG. 8. In FIG. 9a, the layer as in FIG. 9b is shown, resulting in the test pixel as in FIG. 9b. FIG. 9c is the test pixel before (white) applying voltage, and in FIG. 9d it is shown after (shadowed) switching the pixel, as described in example 8.

Figure 1A:
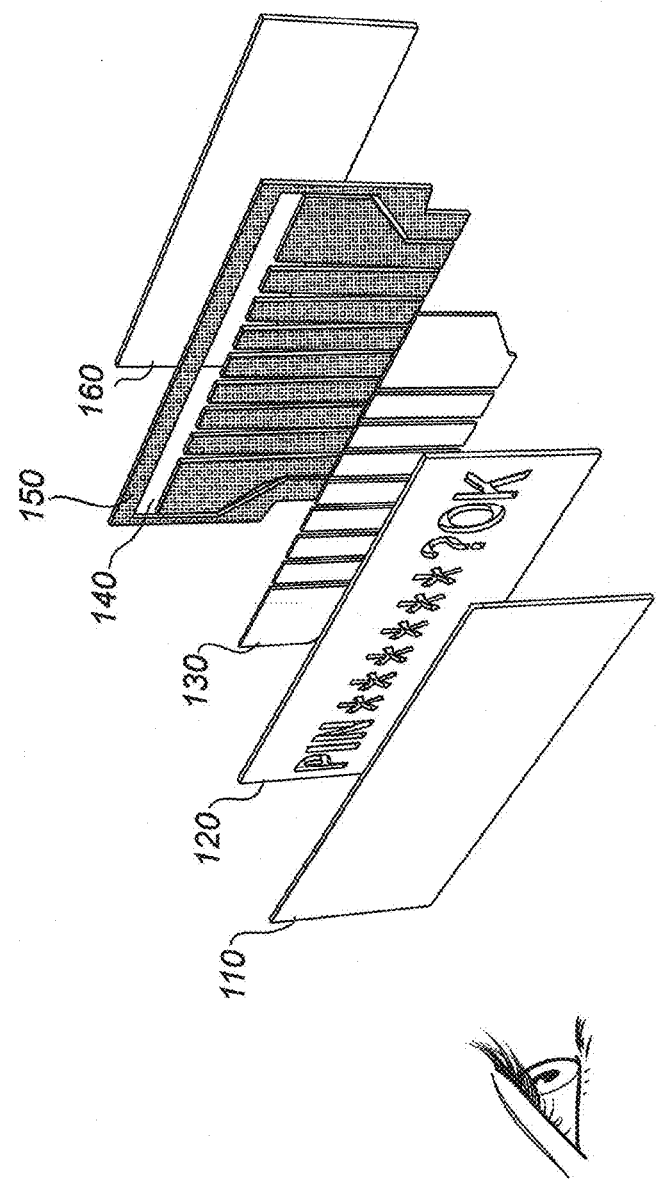
FIG. 1a is a schematic exploded perspective view of a part for a display device according to the invention.

The drawings are not drawn to scale.

DETAILED DESCRIPTION OF EMBODIMENTS OF THE INVENTION

In the drawings, similar or equal elements are referred to by the same reference numerals. The figures are now drawn to scale.

Figures 1B, 1C:
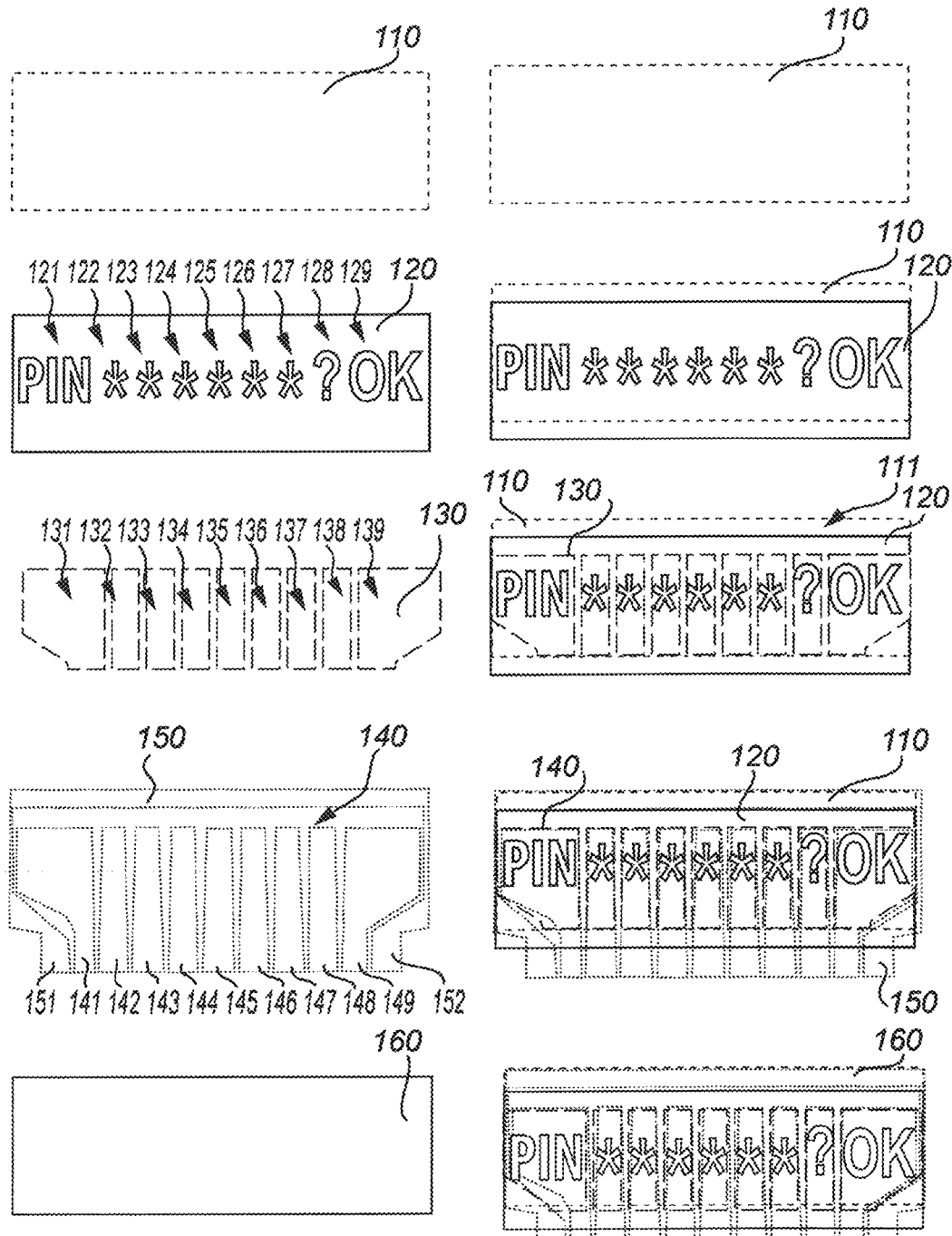
FIG. 1b illustrates schematic top views of each layer of part for a display device according to the invention, arranged in the same order as they faces the viewer from top to bottom.
FIG. 1c illustrates schematic top views of the layers shown in FIG. 1b as they are arranged on top of each other, one by one.
Figure 1D:
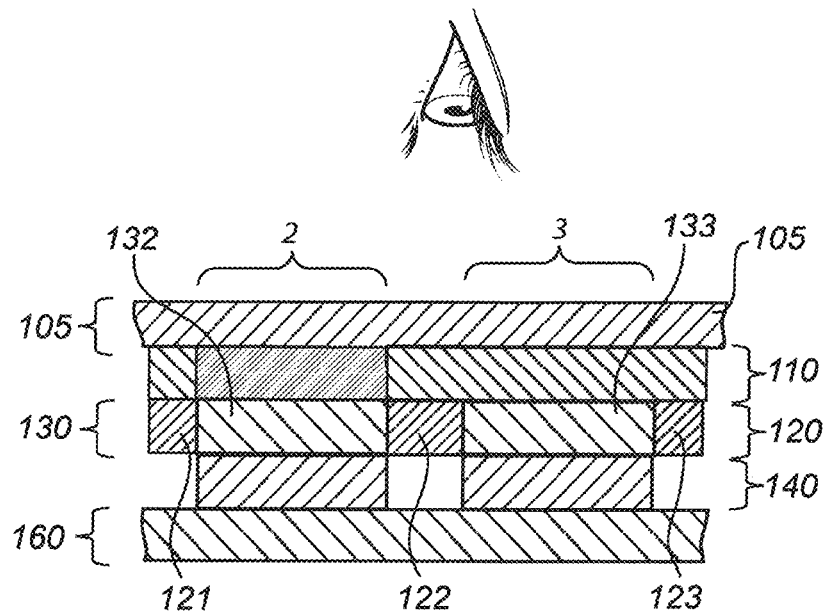
FIG. 1d is a schematic cross-sectional view of a part for a display device according to the invention, and as illustrated in e.g.

FIGS. 1a, 1b, and 1c are schematic drawings illustrating one example of a part for a directly addressed or directly addressable display device. FIG. 1a illustrates the layer one by one, FIG. 1b illustrates the layer when they are piled on top of each other, and FIG. 1c is a cross-sectional view of the layers illustrated in FIGS. 1a and 1b. FIG. 1d is a top view of the device.

Figure 1E:
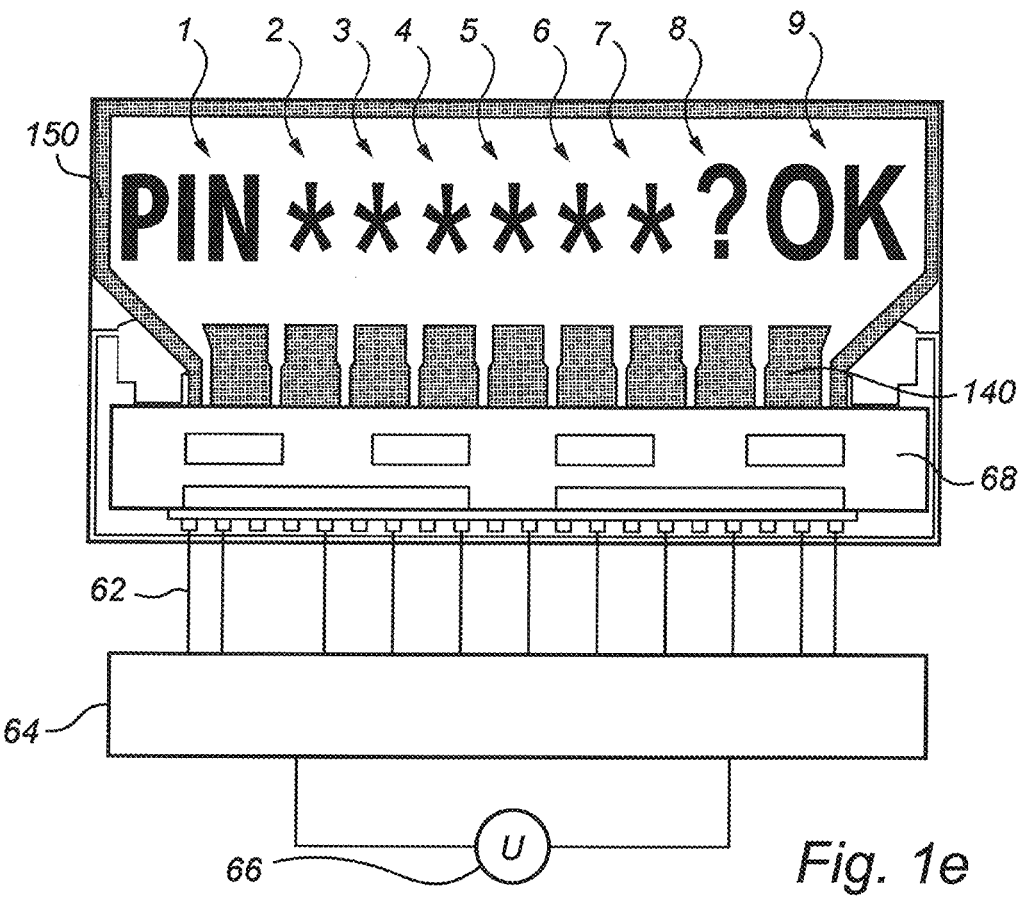
FIG. 1e is a schematic illustration of a finalized or assembled display device.

In more detail, FIG. 1a-1c illustrate a directly addressed or a directly addressable display device comprising nine pixel cells, each pixel cell being arranged for displaying a symbol, which is switchable between an on-state and an off-state. In FIG. 1e all pixels are in their on-state. The pixel cells are numbered 1 to 9, from left to right. The symbol 'PIN' is displayed by pixel cell number 1, i.e. the left most pixel cell is PIN. A star-symbol, '*', is displayed by each one of pixel cells number 2-7. A question mark-symbol, '?', is displayed by pixel cell number 8, and the symbol 'OK' is displayed by pixel cell number 9. The symbol displayable by the respective pixel cells, may be turned on and off independently of the state of the other pixel cells. In operation, normally the symbol 'PIN' is displayed as the display switches on, one star is lit for each character that the user enters/button that the user presses, and upon verification of the PIN-code an OK-symbol is displayed if a match is found, and a question mark if no match is found.

Moreover, the display device is connected to an addressing circuit 64, which in turn is connected to a power supply 66. Each counter electrode 140 of the pixel cells 1-9 is connected to a respective out put of the addressing circuit 64 by electronic conductors 62 by means of a holder or clip 68. The power supply 66 may power the display device, optionally via the addressing circuit 64. The power supply and the optional addressing circuit thereby provides for individual control of the potential difference over each pixel cell 1-9 by the application of different potentials to the counter electrode layer 140 and the pixel electrode layer 150. In other words, one or more power supplies may be directly electronically connected to a respective one of said counter electrodes and the outer electrode 150. According to one example the holder 68 is a 1.25 mm FPC/FFC BackFlip™ Housing, part number 49597-2017 provided by Molex®. However, there exists many different alternatives for connecting the counter electrodes to the electric conductors of a circuit board, which is well known to the person skilled in the art.

As illustrated in FIG. 1c, each pixel cell 2, 3 comprises:

an electrochromic layer 110 comprising electrochromic and electrochemically active organic polymer material being electrochemically switchable between two different visually detectable colouring states;

a counter electrode layer 140 comprising an electronically conductive material, wherein said counter electrode layer in a viewing direction is arranged behind said electrochromic layer;

an electrolyte layer 130, which electrolyte layer is solidified and arranged spatially between, and in ionic contact with, said electrochromic layer and said counter electrode layer;

a symbol defining layer 120, which is arranged in direct contact with said electrochromic layer 110 and which symbol defining layer 120 comprises one or more openings 121, 122 which encloses said electrolyte layer 130 and which opening 121, 122 defines the shape of said symbol.

In more detail, the electrolyte layer 130 is ionically separated between adjacent pixel cells 2, 3 and said electrolyte is a polycationic electrolyte comprising cations having a molecular weight distribution wherein less than 20 wt %, or less than 15 wt % or less than 10 wt % or less than 5 wt % or less than 3 wt % of the cations have a molecular weight lower than 1 000 g/mole.

Further, the cations of the electrolyte composition may have a molecular weight (Mw) between 10,000 and 100,000 g/mole and more preferably between 20,000 and 75,000 g/mole.

With reference to FIGS. 1a and 1b the directly addressable display is now described layer by layer. First a transparent substrate 105 is provided, and an electrochromic layer 110 is arranged thereon. The electrochromic layer is preferably continuous between different pixel cells, such that the electrochromic layers in different pixels cells each is a separate portion of the continuous electrochromic layer. Alternatively, the electrochromic layer may be discontinuous between different pixel cells. In this case, each of the isolated electrochromic layer is provided with a separate electrode for application of a potential.

Secondly, a symbol defining layer 120 is printed on the electrochromic layer 110, which symbol defining layer 120 comprises openings or through holes 121-129, corresponding to the shape of the symbols that are to be displayed.

Thirdly, an electrolyte layer 130 is printed on top of the symbol defining layer 120. The electrolyte layer comprises nine portions 131-139 which are ionically isolated from each other such that the electric field in one electrolyte 131 does not influence the electric field in another electrolyte 132 in an adjacent pixel cell; one portion for each pixel cell. Each portion of electrolyte 131-139 is printed such that it covers the respective opening(s) 121-129 in the beneath symbol defining layer 120. The printed symbol defining layer may have any shape, as long as the electrolyte portions are ionically isolated from each other. Preferably the electrolyte layer is only in direct ionic contact with the electrochromic layer at portions where a colour switch of the electrochromic material is desired.

The symbol defining layer is arranged of ion isolative/insulating material, and advantageously the adhesion between the symbol defining layer 120 and the electrochromic layer 110 is verified, such that a migration and/or diffusion of electrolyte in between the symbol defining layer and the electrochromic layer is prevented or minimized. A migration of the electrolyte may deteriorate the contrast of the displayed image.

Fourthly, a counter electrode layer 140 is printed on top of the electrolyte layer 130. The counter electrode layer comprises nine portions 141-149 which are electronically isolated from each other such that a potential applied to one electrode 141 do not influence the electric field in an electrolyte 132 belonging to an adjacent pixel cell. Each counter electrode portion 141-149 is printed such that it is in ionic contact with a respective one of the electrolyte portions 131-139. The counter electrode layer may have any shape, as long as suitable electric fields may be created in the electrolyte.

Advantageously, one or more pixel electrodes are provided in direct electronic contact with the electrochromic layer for supplying a potential to the electrochromic layer of the pixel cells. In case the electrochromic layer comprises ionically isolated portions, each one of these portions are provided with a respective pixel electrode. In case the electrochromic layer instead is continuous, it may be sufficient to arrange one pixel electrode in electronic contact with only one portion of the electrochromic layer. Alternatively, the pixel electrode may be provided such that the area, where the pixel electrode and the electrochromic layer is in direct electronic contact, extends across or encircles a portion of the electrochromic layer. As illustrated in FIG. 1b the pixel electrode extends across the electrochromic layer at a substantially equal distance from each pixel cell.

In the example illustrated in FIGS. 1a and 1b the pixel cells extends in a first direction. Further, the electrochromic layer comprises a first portion 111 which is not covered by said symbol defining layer and which first portion extends in said first direction at a substantially equal distance from the opening in the symbol defining layer 121-129. Furthermore, the pixel electrode 150 is arranged in direct electronic contact with said first portion 111 of the electrochromic layer along the row of pixel cells. In order to facilitate the connection of the pixel electrode to a voltage source, the contact portions of the pixel electrode are aligned with the contact portions of the counter electrodes. At those portions where the pixel electrode extends closer to one of the pixel cells, the symbol defining layer is arranged such that it extends between that portion of the pixel electrode and the electrochromic layer. According to this example the pixel electrode is printed at the same time as the counter electrode layer, and may be seen as forming one electrode layer.

In other words, the electrode layer comprises both the counter electrode layer and the pixel electrode or pixel electrodes. Optionally, a protective layer 160 is provided on top of the electrode layer to protect and/or encapsulate the display.

Optionally, the colour of the symbol defining layer is the same or substantially the same as the colour of the electrolyte. This is advantageous as it improves the concealing of the symbols to be displayed in the off state of the display.

In operation a pixel is switched from its off state to its on state by applying a potential difference $V_{pixel}$ across the electrolyte of the corresponding pixel cell. The potential difference causes an electrochemical reaction of a volume of the electrochromic layer, which electrochemical reaction causes a colour change of the electrochromic layer volume. The electrochemical reaction is initiated in the interface between the electrolyte and the electrochromic layer, and thereafter propagates within the electrochromic layer to the opposite side of the electrochromic layer—such that the reaction is visible through the transparent substrate.

Care has to be taken when applying the potentials, in order to gain proper advantage of the composition of the electrolyte. In more detail, in a pixel cell comprising a polycationic electrolyte, a lower potential is preferably applied to the electrochromic layer compared to the counter electrode. When the potential is applied, all charge carriers or at least all moveable charge carriers within the electrolyte will move towards the electrochromic layer or towards the counter electrode layer, respectively, the direction being determined by their respective charge. Thus, the larger ion-complexes are to be attracted towards the electrochromic material, as the diffusion/migration of these charge carriers inside the electrochromic material is restricted.

According to one embodiment each portion of the counter electrode layer is provided with the same or substantially the same potential when a pixel is to be switched, in order to facilitate the control of the device. Alternatively, different potentials may be applied to different portions of the counter electrode layer, so as to enable a time differentiated switching of different pixel cells, i.e. that one pixel may be switched at a different rate compared to e.g. an adjacent pixel. The higher the applied potential difference, the faster the pixel switches.

When the pixel device illustrated in FIG. 1d is turned on, or arranged in its on state, a ground potential is applied to the pixel electrode 150 as well as to each one of the counter electrode portions 142-149 except the left most counter electrode portion 141. In response to the applied potential difference $V_{PIXEL}$ across the first pixel cell, the symbol 'PIN' becomes visible in the first pixel cell, due to the electrochromic material being reduced. For each PIN entry, a potential difference $V_{PIXEL}$ is applied to the counter electrode layer portion of the left most not yet activated pixel cell. In other words, for each PIN entry, another star symbol becomes visible from left to right in the display window. When six PIN entries have been made, the PIN code is verified by processing means and if it is correct a potential difference $V_{PIXEL}$ is applied to the right most portion 149 of the counter electrode layer, and the symbol 'OK' becomes visible on the display. If the code is incorrect, a potential difference $V_{PIXEL}$ is applied to the second right most portion 148 of the counter electrode layer, and the symbol '?' becomes visible on the display.

Experiments

Manufacturing Process

The below examples were all manufactured by means of screen printing, using a screen printing mesh having 120 threads/cm, and a thread diameter of 34 μm, and in the below described order, unless stated otherwise. An insulating layer 105, comprising 125 □m thick polyethylene terephthalate (called PET hereinafter) film (Polifoil Bias manufactured by Policrom Screen) was provided and served as the substrate, onto which PEDOT:PSS (Clevios SV3 screen printing paste provided by Heraeus) was uniformly printed in order to form the electrochromic layer 110.

A symbol defining layer 120 (e.g. UV curable dielectric 5018A purchased from DuPont, Uviplast UV curing ink Omniplus UL-025 from Fujifilm Sericol, Ultragraph UVAR from Marabu Printing Inks) having holes defining the images was then printed on top of the electrochromic layer. Additionally, a portion 111 of the electrochromic layer was left free of electrolyte. The thickness of the layer was about 10-20 μm. The symbol defining layer was cured upon exposure to UV light.

Each opening in the symbol defining layer was assigned to a respective pixel cell, and an electrolyte layer portion 131-139 was printed on top of all openings in the symbol defining layer belonging to the respective same pixel, ensuring that the openings in the symbol defining layer were filled with electrolyte, that an electrolyte layer portion belonging to a first pixel cell was not in direct contact with an electrolyte layer portion belonging to a different pixel cell, and that no electrolyte was in ionic contact with the electrochromic layer outside the openings of the symbol defining layer. The thickness of the layer was about 5-10 µm. Thereafter the electrolyte layer was UV-cured, whereupon another electrolyte layer was printed having the same thickness. This final layer was also UV-cured. The electrolyte layer comprises Luviquat Excellence, a copolymer of vinylpyrrolidone and quaternised vinylimidazole in aqueous solution manufactured by BASF, including 10 wt.-% of TiO2 powder (Kronos 2300 manufactured by KRONOS), in order to make the electrolyte white and opaque.

A counter electrode portions 141-149 (electrically conducting carbon paste 7102 purchased from DuPont) was then screen printed on top of each of the electrolyte layer portions, ensuring that a counter electrode portion belonging to a first pixel cell was not in direct contact with a counter electrode portion belonging to a different pixel cell, and that no portion of the counter electrode layer 140 is in direct electronic contact with the electrochromic layer outside the openings of the symbol defining layer. The thickness of the layer was about 5-20 µm.

A pixel electrode 150 (electrically conducting carbon paste 7102 purchased from DuPont) was then screen printed on top of and in direct physical contact with a portion of the electrochromic layer not covered by the symbol defining layer. The portion of the electrochromic layer not covered by the symbol defining layer extends along the 'K' of the pixel cell displaying 'OK'. Further, the pixel electrode extends to the side of the left most and right most electrolyte portion 131, 139, and ends in alignment with the ends of the counter electrodes 141-149. Thereafter the counter electrode layer 140 and the pixel electrode 150 was dried at 120° C. for 3 minutes.

One conducting line was connected to each counter electrode, and one conducting line to each end of the pixel electrode. Finally, the conducting lines were connected to a voltage supply, capable of controlling the electric potential distributed to the pixel electrode, and each counter electrode individually. The applied potential difference across the pixel cell was 3 V unless stated otherwise.

The below discussed photographs have been taken using different cameras, and different illumination set-ups. However, the photographs in FIGS. 2 to 4 have been taken using substantially the same equipment, and the photographs in FIGS. 5 to 6 have been taken using substantially the same equipment.

Importance of the Ion Isolative/Insulating Layer

In all the photographs below, the display is viewed through the insulating layer 105, and due to a mix-up at the screen mesh manufacturing process the symbol defining layer was inverted. According to one example, the ion isolative/insulating layer was omitted in the display device architecture in order to investigate how the lacquer layer affects the sharpness of the resulting display, i.e. the display device was structured according to PET 105/PEDOT:PSS 110/Electrolyte 130/Carbon 140, 150.

Figure 2A:
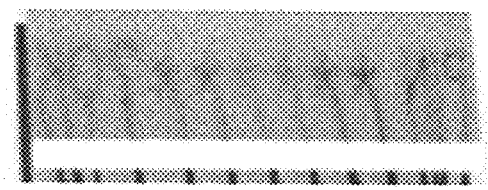
FIGS. 2a-2b, 3a-3b, 4a-4b, 5a-5d, and 6a-6c are photographs of portions of display devices having different configurations.
Figure 2B:
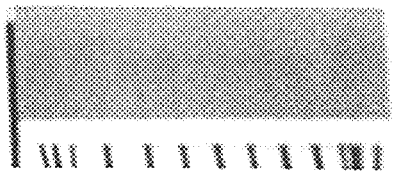

Directly after the switching the symbols were visible as seen in FIG. 2a, but only after a few minutes the symbols becomes completely blurred as seen in FIG. 2b.

According to a second example, the ion isolative/insulating symbol defining layer was arranged between the counter electrode and the electrolyte, instead of between the electrolyte and the electrochromic layer. Hence, the device had the following structure: PET 105/PEDOT:PSS 110/Electrolyte 130/Lacquer 120/Carbon 140, 150.

Figure 3A:
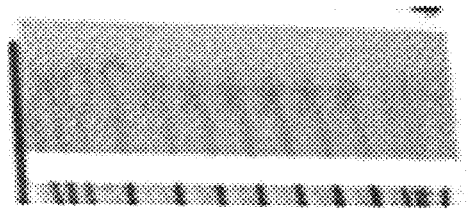
Figure 3B:
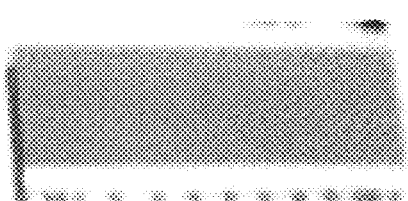

FIG. 3a is a photograph having an arrangement according to the second example taken directly after switching the display to its colored state by applying 3 V. FIG. 3b is a photograph of the same display taken after a few minutes after switching of the display, wherein the predefined image pattern has become completely blurred and unrecognizable.

Figure 4A:
Figure 4B:
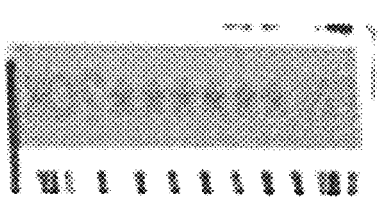

According to a third example the display is manufactured as described in relation to the Manufacturing process section above, i.e. the layers are arranged in the following order PET 105/PEDOT:PSS 110/Lacquer 120/Electrolyte 130/Carbon 140, 150. FIG. 4a is a photograph taken of the display device a few minutes after the potential differences were applied to the pixels cells, and the symbols are still sharp. FIG. 4b is a photograph taken of the display device after an electric potential difference of 2 V has been applied to the pixel cells for more than 60 minutes, and the display shows no observable degradation or blurred symbols.

Importance of Pixelated Electrolyte

Figure 5A:
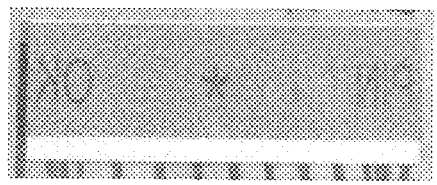
Figure 5B:
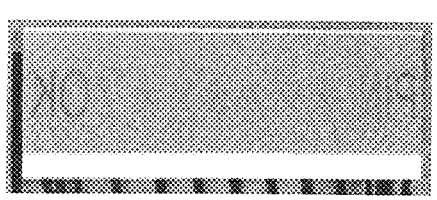
Figure 5C:
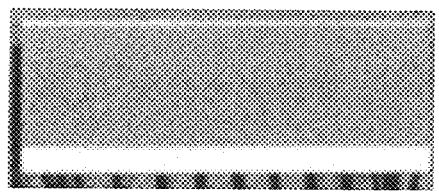
Figure 5D:
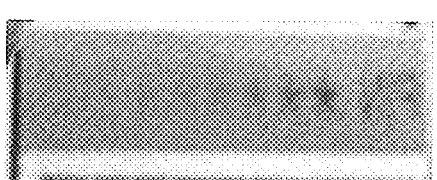

FIGS. 5a-d are photographs of a display device having a continuous or non-pixelated electrolyte layer. The display device is produced in accordance with the description provided in relation to the Experimental section above, except that the electrolyte layer is continuous, i.e. there is direct ionic contact between electrolyte portions belonging to different pixel cells. In other words, the only difference between the display device illustrated if FIGS. 4a and 4b, and the display device illustrated in FIGS. 5a-5d is the pixelated/continuous electrolyte layer. FIG. 5a shows that three segments are switched initially, while six segments remain in their non-switched state. After disconnecting the voltage supply, the inherent voltage of the initially switched segments causes a potential difference across several other display cells. FIGS. 5b and 5c show how the segments are equilibrating the built-in voltage after ~10/90 minutes, respectively. FIG. 5d shows the lateral cross-talk after ~90 minutes cycling by using a waveform generator; square wave, 200 mHz, 2.5V/1.5V reduction/oxidation. Note that an electric potential difference is only applied to the first pixel cell or the 'PIN' segment, but the lateral cross-talk is switching the neighbouring segments.

Importance of Polycationic Electrolyte

Figure 6A:
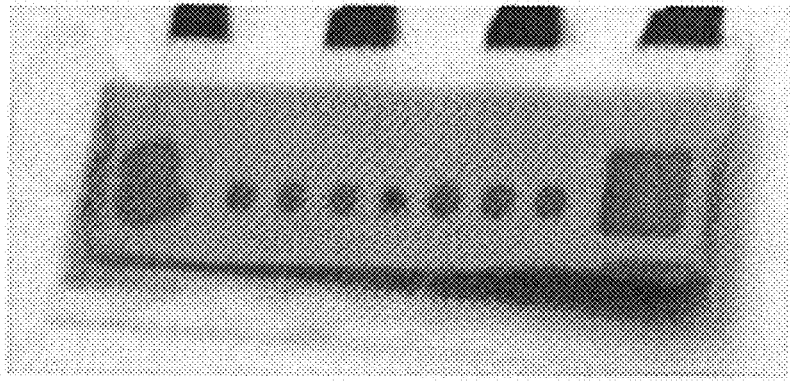
Figure 6B:
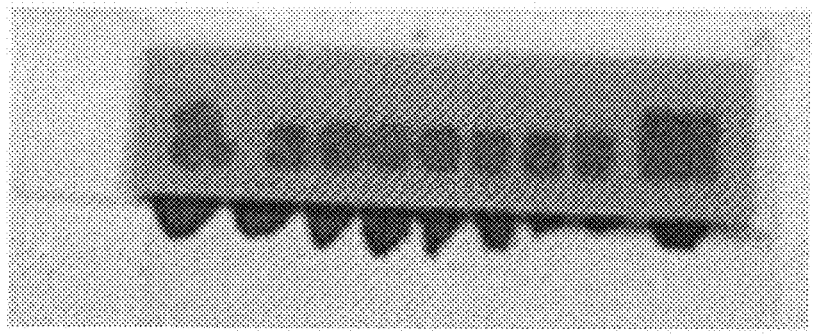
Figure 6C:
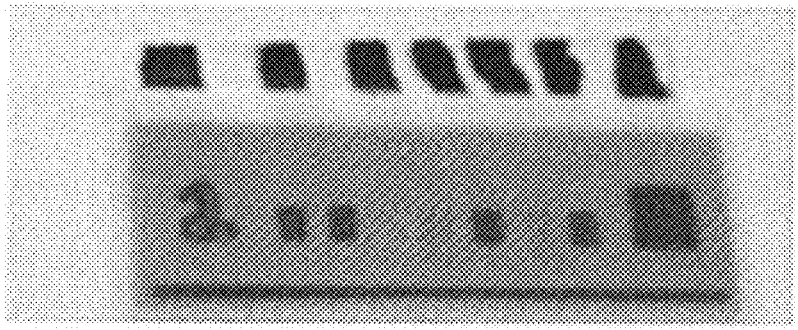

The photographs in FIGS. 6a-6c illustrate the importance of a polycationic electrolyte. The display devices are produced in accordance with the description provided in relation to the Experimental section above, but different electrolytes were used in the three display devices. FIG. 6a: the electrolyte comprises an ionic liquid based on 95 wt % EMI-ES (ethylmethylimidazolium ethyl sulfate) in 5 wt % HEC (hydroxyethyl cellulose). FIG. 6b: the electrolyte is based on 40 wt % PSS polyanion, poly(styrene sulfonate), 10 wt % D-sorbitol, 10 wt % glycerol and 40 wt % deionized water. FIG. 6c: the electrolyte is a UV-curable electrolyte based on the polycation Luviquat Excellence, a copolymer of vinylpyrrolidone and quaternised vinylimidazole in aqueous solution manufactured by BASF, including 10 wt.-% of TiO2 powder (Kronos 2300 manufactured by KRONOS). The TiO2 is used in order to make the electrolyte white and opaque. The same settings were used for all displays, i.e. coloration were performed by applying 3V and the photographs were taken approximately 3 minutes after display coloration and disconnection of the electric potential. The fact that three pixel cells are unswitched in FIG. 6c is due to that the step coverage of the corresponding counter electrodes was insufficient and the pixel cells were therefore broken at the display manufacturing. As can be seen in the Figures neither the polyanionic electrolyte (Figure b) nor the ionic liquid electrolyte (FIG. 6a)

are capable of maintaining an image being as sharp as the one comprising a polycationic electrolyte (FIG. 6c).

Without being bound to this theory the inventors guess that the reason why FIG. 6c is significantly sharper compared to FIGS. 6a and 6b, is due to that cations are restricted from moving laterally in the PEDOT:PSS layer. In more detail, in its unswitched state the polymer of the electrochromic material is oxidized and has positive charges. However, as there need to be a charge balance in the material, the material also contains a corresponding amount of negative charges. In the case of PEDOT:PSS, negative charges are—the SO3—groups, i.e. the conjugate base for dissociated sulfonic acid in the PSSH polymer. When PEDOT is reduced, it will gain electrons and loose positive charges, i.e. an excess of anions will form, which needs to be compensated by either anions diffusing from the material, or by cations diffusing/migrating into the material. Practically, the anions can not quickly diffuse from the material, as PSSH is a rather large molecule which may also be immobilized by covalent bonds or electrostatic bonds. Hence, cations must enter the material, so that the PEDOT:PSS can be reduced, and hence be switched. Thus, electrochromic reduction of PEDOT:PSS in an electrochemical cell of polycations is a faradic reaction in which colouring is controlled by the transport of the polycation in the electrode material. Apparently, this transport is possible at length scales corresponding to the film thickness of the material, on the order of 10 micron, a distance not visually distinguishable by the naked eye. So by applying an insulating symbol defining layer will improve the sharpness of the switched symbol. Further, restriction of the polycation mobility in the electrode covered by the symbol defining layer may be obtained if binder molecules in said layer diffuses into the electrode to obstruct transport paths for the polycation. Electrochemistry based on Faradic reactions necessitates a transport of ions in and out of the material being reduced. Furthermore, PEDOT:PSS, has a relatively porous structure, such that the polycations are capable of a vertical ingress into the electrochromic material upon applying an electric potential. However, the polycation molecules are not capable of lateral spreading throughout the electrochromic material, under the symbol defining layer, at least not at an extent visible to the naked human eye. This is partly thought to be due to their large molecular weight and partly due to that the electric field is forcing vertical migration rather than lateral migration and/or lateral diffusion of the polycations. This, in turn, results in a sharp image in the resulting display device.

However, a large amount of small cations are easily movable in the electrochromic material and tend to move significantly in the lateral direction, hence giving rise to a blurred image.

The devices work well also with a quite substantial amount of small anions present in the electrolyte layer. This is believed to be due to that moveable anions are attracted towards the counter electrode and/or due to that even if anions enter the electrochromic layer they would contribute to an oxidation of the electrochromic material, which normally brings the electrochromic material into its bleached state. I.e. they usually do not contribute to a blurring of the symbol to be presented in the display.

Figure 7A:
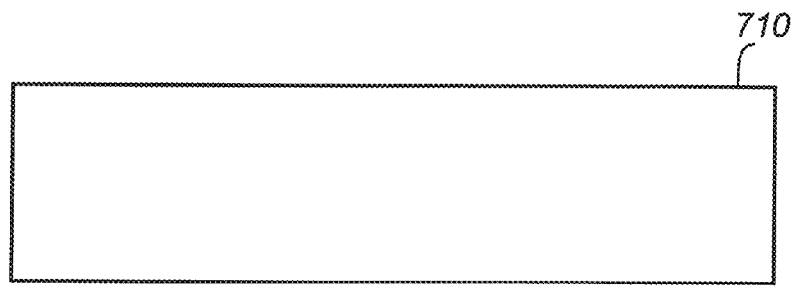
FIGS. 7a-7d are top views of the layers in a 7 segment display according to the invention.
Figure 7B:
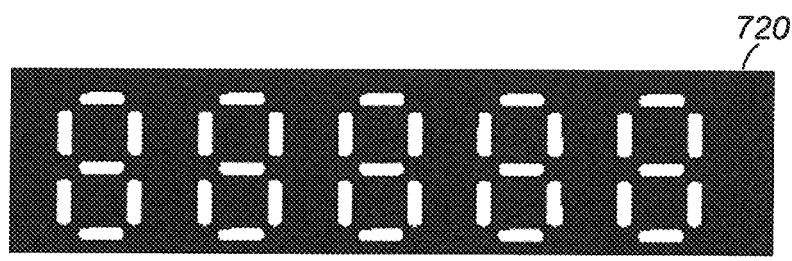
Figure 7C:
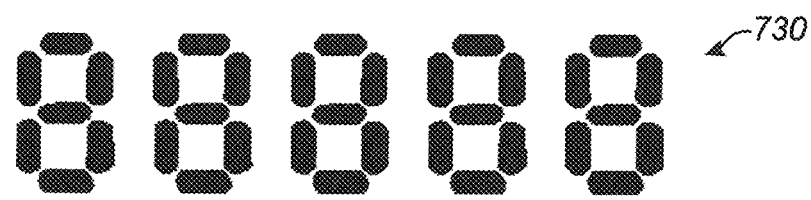
Figure 7D:
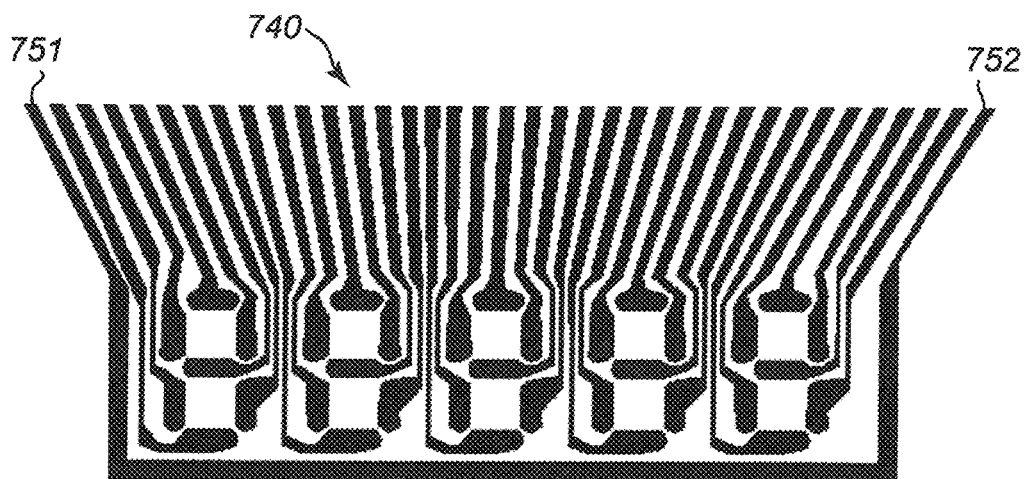

FIGS. 7a to 7d illustrates one example of layers which may be used when forming a 7-segment display device according to the invention. The electrochromic layer 710 is illustrated in FIG. 7a, the symbol defining layer 720 is illustrated in FIG. 7b, the electrolyte layer 730 is illustrated in FIG. 7c and the counter electrode layer 740 as well as the pixel electrode layer 750 are illustrated in FIG. 7d. By applying a e.g. ground potential to the pixel electrode and a more positive voltage to one of the counter electrodes, a respective segment in the display may be switched.

More Details about the Polyionic Electrolyte

The expression polyionic electrolyte and polyelectrolyte are used interchangeably in this document. The polyelectrolyte has the property to provide ions and ion mobility sufficient for the composition to function as an electrolyte in an electrochemical cell. The polyelectrolyte provides mobile counter ions and the whole composition provides mobility for ions to provide for electrolytic connectivity between the electrochromic material and the counter electrode sandwiching the electrolyte. This means that the ion transporting paths in the electrolyte should be sufficient to provide ion transport for the electrochemical switches in the electrodes.

The polyelectrolyte can be selected amongst polycationic materials, like cationic polymers, preferably polymers having quaternized ammonium groups. Examples of polyelectrolytes being cationic polymers are poly[(3-methyl-1-vinylimidazolium chloride)-co-(1-vinylpyrrolidone)] and poly(diallyldimethylammonium chloride).

Further, the poly[(3-methyl-1-vinylimidazolium chloride)-co-(1-vinylpyrrolidone)] is available as 'Luviquat Excellence™' which is a solution comprising 40 wt % of poly[(3-methyl-1-vinylimidazolium chloride)-co-(1-vinylpyrrolidone)] in water. The poly[(3-methyl-1-vinylimidazolium chloride)-co-(1-vinylpyrrolidone)] is a copolymer having 95 mole % 3-methyl-1-imidazolium chloride repeating units and 5 mole % vinylpyrrolidone units. The product is available from BASF GmbH.

The poly(diallyldimethylammonium chloride) is typically used as a water solution comprising 35 wt. % poly(diallyldimethylammonium chloride). The polycationic polyelectrolyte is available from Sigma Aldrich. The electrolyte composition of the invention may also comprise further components, like for example surface active agents, lubricants, process stabilizers.

The Binder System

The optional polymeric binder included in the binder system shall have at least one polymerizable sites, or polymerizable groups. The polymeric binder may be a homopolymer, or co-polymer, or any other combination of monomers. The binder suitable for the present invention shall be polymers comprising monomers having only one polymerizable group, i.e. are monofunctional monomers. Example is monoacrylates. The polymer may also comprise monomers having two or more functional groups, sites for the polymerization. Further examples of such polymers are di- and polyacrylates, preferably polyethyleneglycol diacrylate.

Further as the binders are to exist in an electrolyte, they should preferably be able to dissolve and transportions between the electrodes in the electrochemical device.

Typically the binder molecules are selected from the following groups of polymers or copolymers: polyethyleneglycol diacrylate, polypropylene glycol diacrylates, and polyethyleneglycol monoacrylates, polypropyleneglycol monoacrylates, or mixtures thereof.

The binder system may consist of molecules able to form a polymeric network, i.e. the binder, after print deposition to provide cohesive and adhesive strength and integrity to the system. The binder system may comprise one or more binders and one or more initiators for forming the polymeric network including the polyelectrolyte and the solid particulate phase. The binder and the binder system may be curable after the initiation by for example ultraviolet radiation, which initiates the cross-linking, networking reaction. Examples of such binders are polyethyleneglycol diacrylate, Mn 700.

The polyelectrolyte composition of the invention may also comprise one or more photoinitiators. These are typically added together with the binder system. The photoinitiators have the ability to initiate a polymerization upon irradiation, thus to cure the polyelectrolyte composition.

Further, the photoinitiator is initiated at a specific wave length, by mixing two or more photoinitiators, being initiated at different wave lengths, the range of wave lengths at which the photoinitiator is activated, and the polyelectrolyte cured, may be broadened.

The photoinitiator, one or more, should preferentially be compatible with all materials in the composition. This means that they should function in composition filled with white pigment particles, meaning that they should initiate in light that are transmitted through such particle dispersion. Further, water may be present in the composition, and all components are to some extent soluble in water, therefore a certain distribution of photoinitiator in water is desirable. UV-curing of printed electrolytes being opaque can be challenging, especially for photoinitiators absorbing at short wavelengths. In the case of white pigments, the light is scattered through the material. For good bulk curing, needed to obtain good cohesion and adhesion to the underlying material, one can use a photoinitiator absorbing at long wavelengths that can pass the pigment filled material.

Examples of photoinitiators are Irgacure 2959, 2-Hydroxy-4'-(2-hydroxyethoxy)-2-methylpropiophenone 98%, purchased from Sigma Aldrich; Esacure ONE™, which is a difunctional-α-hydroxy ketone, available from Lamberti SA. Esacure is a photoinitiator showing high reactivity which may be an advantage when curing the electrolyte; Diphenyl(2,4, 6-trimethylbenzoyl)phosphine oxide, 'Lucirin TPO' (available from BASF). Alternatively, the binder system may comprise one or more binders which are curable upon thermal treatment.

Plasticizer

A plasticizer may be used to maintain and enhance the printing quality as it helps the electrolyte to flow better through the screen mesh and to give a smoother surface layer of the electrolyte. Typically the plasticizer to be included in the polyelectrolyte composition of the invention is a co-polymer comprising polyethylene glycol (PEG) and polypropylene glycol. An example of plasticizer is poly(ethyleneglycol-ran-propyleneglycol), Mn 12000.

Process Stabilizer

The electrolyte composition may also comprise one or more process stabilizers to make the composition stable during further treatment like elevated temperature. The process stabilizer makes the composition to stand the treatment without disruption or cracking. Typically, the electrolyte composition endures thermal treatment of up to 140° C. for several minutes. The process stabilizer keeps the surface layer intact during the heat treatment. Examples of process stabilizers having this purpose are aliphatic carboxylic acids. Preferably, the acid has a low melting point, in combination with a high boiling point. More specifically the stabilizer may be 2-hydroxypropionic acid, in its DL-form, also denoted DL-lactic acid. This lactic acid has a melting point of −53° C. and boiling point of 122° C., at 12 mm Hg.

The Particulate Phase

The particulate phase is present in the electrolyte composition for the purpose to provide a cationic polyelectrolyte stable against interruption, pin-holes and cracks. The particulate phase shall be present in an amount of 5 to 40%, by volume, of solid particulate phase.

The size of the particles in the particulate phase shall be between 1 nm and 10 µm, for example between 0.1 µm and 5 µm, for example particles of about 0.3 µm or about 0.4 µm (average size). The median particle size may be 0.36 µm.

The particulate phase may consist of a solid particulate phase comprising solid particles being inert to the other components included in the electrolyte composition of the invention, and substantially not electronically conductive. For example, the solid particulate phase may consist of particulate pigment. The pigment present in the composition may prevent the electrolyte from being transparent so the equipment underneath, such as the electrodes, is concealed. By this a maximum contrast may be obtained for a vertical electrochrome display. Examples of pigment are white titanium oxide ($TiO_2$) pigment, Kronos 2300, available from Kronos AS, Norway. The solid particulate phase may also consist of plastic material. Also mixtures of solid particle consisting of pigment and plastic material may be included in the electrolyte composition of the invention.

The particulate phase may also be formed as a complex between the polyelectrolyte and an ionic surface active agent, a liquid-liquid colloid where the colloid is characterized by being stabilized by ionic surfactant forming a complex with an oppositely charged polyelectrolyte. These complexes are known as polyelectrolyte-surfactant complexes, often abbreviated as PE-Surfs. The cationic polyelectrolyte as is included in the electrolyte composition of the invention is mixed with an anionic surface active agent, a complex is formed which results in a particulate phase in the electrolyte composition.

When ionic surface active agents are added to oppositely charge polyions, stable complexes are formed by a self-assembly process, and are further described in 'Mesomorphous polyelectrolyte-surfactant complexes', Antonietti, M., et al., Adv. Mater, 7, 751, 1995 which is hereby incorporated by reference. This type of polyelectrolyte complex can be of interest in cases when the properties of a solid pigment not are needed for optical reasons, and when presence of solid particles makes processing difficult.

The particulate phase can also consist of ion exchange particles. Such particles are characterized by being able to exchange ions, either anions or cations with an electrolyte, can be charged with a desired ion type. Further, they are typically densely cross-linked and dimensionally stable to changes in humidity and ion strength. An example of a commercially available anion exchange particles is Dowex 1X2 chloride form, 200-400 mesh, a resin in particle form charged with chloride ions. An example of a cation exchange resin is Dowex 50WX4 Na+-form, 200-400 mesh, a resin in particle form charged with sodium ions. Such ion exchange particles can be charged with desirable ions and be included as particulate phase in the invention. This particulate phase is also to be considered when pigment not is needed for optical reasons.

A dispersing agent may be present to maintain dispersion when the water has evaporated. This is typically compound that is liquid at room temperature, such as lactic acid. Without this dispersing agent, the particles may aggregate and the coating may form cracks.

The electrolyte composition of the invention comprises also a liquid medium. Depending on the components included in the polyelectrolyte composition of the invention, the liquid may be selected from water or solvents, or mixture thereof. Typically, the liquid is aqueous liquids, for example water, or water mixed with lower alcohols, for example ethanol.

Also a method of preparation of the electrolyte composition comprises following steps:
a) providing a solution comprising polyelectrolyte;
b) dispersing a particulate phase in the polyelectrolyte solution provided in step a), for example by using a mechanical treatment, such as a mechanical homogenizer;
c) providing a binder system dissolved in a solution comprising binder molecules and photoinitiators; and
d) mixing the dispersion of polyelectrolyte and solid particulate phase provided in step a) with the solution of step b) comprising the binder system, and also the other components. The mixing may be a mechanical mixing in, for example, a homogenizer.

Typically, the method of preparation of the electrolyte composition comprises following steps:
a) providing a solution comprising polyelectrolyte;
b) dispersing a solid particulate phase in the polyelectrolyte solution provided in step a), for example by using a mechanical treatment, such as a mechanical homogenizer;
c) providing a binder system dissolved in a solution comprising binder molecules and photoinitiators; and
d) mixing the dispersion of polyelectrolyte and solid particulate phase provided in step a) with the solution of step b) comprising the binder system, and also the other components. The mixing may be a mechanical mixing in, for example, a homogenizer.

The polyelectrolyte may be present in an amount of 15-65% by weight; the polymeric binder in an amount of 5-25% by weight; one or more photoiniator(s) in an amount of 0.1-5% by weight; process stabilizer in an amount of 5-35% by weight; the plasticizer in an amount of 1-30% by weight.

The electrochemical cell comprising the electrolyte composition may comprises the following components:
optionally a substrate;
a first electrode;
one or more layers of the electrolyte composition of the invention applied onto the first electrode;
a counter electrode; and wherein each layer of the electrolyte composition being cured before applying the second electrolyte.

The electrochemical cell may be a directly addressed or a directly addressable display device as described above, and the electrochemical cell may comprise an electrolyte composition comprising a pigment.

The layers of electrolyte composition may have a thickness of between 0.5 µm and 50 µm, for example between 1 µm and 30 µm, or between 5 µm and 15 µm. Preferably the electrolyte composition is deposited with a thickness of about 10 µm.

Thereby it is possible to deposit an even film substantially without pin-holes. Further, a higher density after the curing may be obtained if the electrolyte layer comprising pigment is applied as thinner layer.

The Substrate

The electrochemical cell may be placed and applied upon a substrate. The substrate in step a) may be selected from substrate of plastic material, of any fibrous material, of textile, or paper. The substrate shall be suitable for the printing method selected.

More Details and Examples about the Electrolyte

In this section, example electrolyte compositions are described. It should be noted that other electrolytes than these described here may be used according to the invention. The electrolytes described here are a result from the efforts to find an electrolyte with good printing properties.

Thus, preferably the electrochemical composition is printable, and in general it is advantageous to provide a printable electrochemical device by printing an electrolyte on top of a first electrode, for example the electrochromic layer or the counter electrode layer, and to print a second electrode, for example the counter electrode layer or the electrochromic layer, on top of the electrolyte. Suitable electrolytes for such an application shall fulfill some requirements, they shall be printable and they shall be over-printable. These properties are in addition to their basic function on having the ability to function as an electrolyte in the device.

It is desirable that the device can be printed on a flexible substrate, for example a porous or fibrous substrate such as paper, and that it can function in a range of environmental conditions without the need for encapsulation. The condition that the device should be printable on fibrous and porous substrates challenge the mobility of the electrolyte at the same time as a minimum mobility is essential for the function of the electrolyte.

The most common group of printable electrolytes consists of either an ionic liquid in a binder system, such as in WO 2008062149 A1, or a salt dissolved in a solvent in a binder system. However, these systems comprise ions that can migrate from the place of print deposition, especially if the substrate is porous, leading to ion depletion in the printed area and contamination of other components. On the other hand, a certain degree of mobility is required for the function of the electrolyte. It is desirable that the electrolyte salt can migrate at least to some extent through the film thickness of the electrode layers between which it is sandwiched.

It has been found that an electrolyte based on polycations provide an acceptable degree of mobility in printed structures, so that ion transport between electrolyte and electrode is sufficient, while migration of the polycations on fibrous substrates is acceptably low. It has also been found that printing polyelectrolytes with screen printing can be problematic due to the amphifilic nature of many polyelectrolytes. As amphiphiles, they can stabilize foams and bubbles. Further, the high molecular weight of the polymer enables formation of bubbles and filaments. In screen printing, where fluid ink meets air and passing a fine mesh, bubble formation is well accommodated. In the ink ink-split moment, when the web is lifted from the substrate, conditions for filament formation are ideal. Filaments and bubbles can lead to poorly defined prints and pin-holes.

It is further desirable that the composition forming the electrolyte has a good printability on a first electrode, as well as the substrate surrounding it, so that a pin-hole free film can be obtained by printing. Further, the so print deposited film should be curable to a film stable enough to be overprintable by a composition forming a second electrode.

Thus, there is a need to destabilize or suppress formation of bubbles or filaments during screen printing of a printable composition based on a quaternized polycation in a cross-linkable binder system.

The most common way to reduce foam and improve leveling in inks involves adding surfactants and silicon based compounds. There are reasons to avoid typical surfactants in an electrochemical cell. The surfactants can form thin insulating layers reducing the ionic connectivity in the cell. It is also known that addition of hydrophobic particles can limit foaming in oil based inks as well as in water-based inks and that hydrophilic particles can stabilize foaming.

The electrolyte composition described below will upon curing form a layer of electrolyte that cover the area of the underlying electrode, the first electrode, substantially without any interruptions in its structure. The printable electrolyte shall also provide good adhesion to the underlying layers as well as being printable, also when aqueous-based composition being printed onto the electrolyte.

The procedure where applying the electrolyte composition onto the first electrode, and subsequently curing the electrolyte composition may be repeated several times, to obtain multiple layers of the electrolyte upon the first electrode. An advantage achieved by the procedure is that a reduced density of the electrochemical cell and reduced area of pin-holes may be obtained. Also an increased opacity of the electrolyte may be obtained. Further, by printing the electrolyte twice with two thin layers, instead of using one layer with the same thickness as the two layers, an improved curing at the bottom of the printed layer may be obtained which may be an important aspect when curing with UV-light is used. The UV-light is adsorbed in the opaque layer and an improved result may be obtained in thin layers.

An object for the example electrolytes described below is to provide printable and curable electrolyte composition based on concentrated polyelectrolytes, where by 'concentrated' is meant that the concentration of polyelectrolyte in the water included in the compositions exceeds 10%.

It has been found that an electrolyte composition comprising a concentrated polyelectrolyte in form of a colloid may give an ink with good printing properties to the extent that filament formation and foaming is suppressed.

An example electrolyte composition forming a colloid, comprises
a) polyelectrolyte selected from one or more cationic polymers comprising quaternised nitrogen atoms;
b) a solid particulate phase of particles having a median size of between 10 nm to 10 µm;
c) a binder system comprising binder molecules;
d) optionally, a plasticizer;
e) optionally, a processing aid agent; and
f) optionally, a surface active agent.

The polyelectrolyte (a) included in the composition provides a composition with ions and ion mobility necessary for the function of the electrochemical cell. The polyelectrolyte may have a degree of mobility limited by the size of the polyelectrolyte molecules and by the network formed by the binder system. The polyelectrolyte shall be substantially absent from groups that are readily polymerizable under conditions of polymerization, especially typically radical polymerizations.

The solid particulate phase (b) forms a colloid in the polyelectrolyte composition. The solid particles are able to destabilize filaments, films and foams, and are also able to prevent the formation of such structures. In addition to destabilize foams and filaments, the solid particulate phase can have other functions such as modifying the optical properties, for example to make the electrolyte layer opaque, or as particles releasing agents in a controlled manner after deposition or solids binding water.

The binder system (c) comprises binder molecules which may form a network upon polymerization encompassing the polyelectrolyte and reduce its mobility in the cured electrolyte. The binder system comprises also an initiator for the polymerization.

A plasticizer (d) is optionally added to the electrolyte composition to provide flexibility to the cured film. In a humid environment, the polyelectrolyte absorbs water molecules that have a plasticizing effect on the contents of the printed and cured composition. In absence of water, and at low humidity the film can become hard and lose its ability to transportions. A plasticizer can therefore be added to provide flexibility to the film. The plasticizer may be selected from a flexible polyether, a polyol, such as glycerol, polyglycerol or a fluid hyperbranched polyol.

An additional example of the electrolyte composition is an electrolyte composition comprising
a polyelectrolyte in an amount of 15-65% by weight;
a solid particulate phase in an amount of 15-65% by weight;
a binder system comprising a binder molecules in an amount of 5-25% by weight together with one or more initiator(s) in an amount of 0.1-5% by weight;
a processing aid agent in an amount of 5-35% by weight; and
a plasticizer in an amount of 1-30% by weight.

An additional example of the electrolyte composition is wherein the polyelectrolyte comprises quaternized polyamine, having quaternized amino groups in the polymer backbone, such as ionenes, or having pendant quaternized amino groups.

A further example of, the electrolyte composition is where the quaternised polyamine is a copolymer having quaternised vinylimidazolium repeating units, preferably the copolymer comprises 40-99 mole percent quaternised vinylimidazolium repeating units. In a further example, the electrolyte composition comprises a quaternised polyamine being a quaternised chitosan, either quaternised at the nitrogen atom connected to the pyranose backbone of the chitosan, or a nitrogen atom located at a side group attached to the polymer backbone.

An additional example of electrolyte composition is wherein the electrolyte composition comprises solid particulate phase in an amount between about 15 and 65% by weight the total amount of the dry electrolyte composition. The particles are present in the polyelectrolyte for avoiding pinholes and foaming when applying it onto the electrode, before its curing.

In another example the solid particles comprises material with water-binding and water-absorbing properties. Examples of such material are hydrogels. The hydrogels may consist of polysaccharides, preferably cross-linked polysaccharides. Water-binding particles, such as hydrogel particles, and ion exchange particles may have the function of binding water to the polyelectrolyte composition to prevent drying of the particle rich electrolyte composition. If drying of the composition occurs in early and premature stage, this may cause operational process problems such as clogging of printing screens and prevent leveling of printed electrolyte compositions. After printing, it is desired to permit the composition to flow so that patterns left by the screen mesh or pin-holes can level out, in a process called leveling, before the film is cured. A too early, premature, drying prevents leveling and leads to an uneven film with pin-holes. Further, adding particles to a white pigment may improve scattering and improve the white-out effect of a white pigment.

An example of the electrolyte composition is wherein the solid particulate phase comprises pigment particles, preferably titaniumdioxide ($TiO_2$) or zinc oxide (ZnO) pigment particles. By having pigment present in the electrolyte composition, forming an opaque composition, a possibility to hide parts of the electrode and electrochemical cell is provided which may be an advantage for some applications of electrochemical devices, for example when electrode materials can be printed thereon.

In one example, a processing aid agent is present, preferably the processing aid agent being a dispersing aid, more preferably the processing aid agent is lactic acid, more preferably DL-lactic acid.

An electrolyte composition for screen printing, for flat-bed printing or rotary printing is provided by the electrolyte examples presented here.

The electrochemical cell is printable, for example by methods like screen printing and potentially flexographic printing.

The example electrolyte composition described here are suitable for a vertical electrochemical cell.

To provide printable and irradiation curable printing inks based on concentrated polyelectrolytes producing opaque electrolyte prints, onto which electrode materials can be printed. It has been found that formulating a composition from a concentrated polyelectrolyte as a colloid, where the minority phase is titanium oxide particles, produces an ink with good printing properties.

The electrolyte composition may optionally comprise a surface active agent, preferably the surface active agent is selected from lecithin and polysorbates, most preferably the polysorbate Polyoxyethylene (20) sorbitan monolaurate (available as Tween 20).

A method for preparing the electrolyte composition may comprise the steps of:

a) dispersing a solid particulate phase in a polyelectrolyte solution, preferably by homogenization, for example by mechanical homogenization or sonication;

b) preparing a solution comprising a binder system comprising binder molecules and initiator molecules;

c) mixing of the polyelectrolyte-particle dispersion of step a) with the binder solution of step b).

Step c) may be performed in any suitable equipment, for example a homogenizer.

Further optional components of the electrolyte composition may be added, also further amount of liquid forming the dispersion.

Further advantage of the electrolyte composition is that the cured electrolyte composition can serve as printing substrate even for water based printing inks.

The printable electrolyte compositions described below may, for example, be provided in vertically printed electrochemical devices. In a vertically printed electrochemical cell, the electrolyte layer is printed on top of an electrode material, and over the electrolyte, another electrode is deposited to form the electrochemical cell. This way of building electrochemical cells puts certain criteria on the printable electrolyte composition.

First, it should be able to produce a stable and pin-hole-free film with good adhesion to the underlying electrode, as well as to the substrate surrounding the electrode. A vertical electrochemical cell is a stratified laminate structure. Structural integrity of the cell requires adhesion between electrodes and electrolyte, as well as between electrode and electrolyte to the substrate.

Further, printing a second electrode (1020) over an electrolyte covering the first electrode (1010) requires that adhesion is obtained between the electrolyte and the first electrode, otherwise tension when the screen is lifted may cause delamination. Otherwise, the electrochemical cell (1001) would be short circuited when the second electrode would be printed on top of the electrolyte, and reach the first electrode through the pin-holes. Poor adhesion can lead to delamination or cracking of the film, which could reduce connectivity of the electrodes or lead to short circuits in the cracks. In addition, it should be possible to print a second electrode on top of the electrolyte. This means that the electrolyte should be stable to the effects of the solvents used in print deposition of the second electrode. Otherwise, the electrolyte layer would swell and wrinkle with poor connectivity of the second electrode as consequence.

Further, the electrolyte components supporting the conductivity must be sufficiently immobilized. Otherwise, they may migrate throughout the structure with device performance degradation, or even malfunction, as a consequence. If the electrolyte itself migrates, the electrolyte may be depleted inside the cell, but it can also lead to contamination in other parts of the device and shall be avoided.

Further, other components in the composition could migrate, leading to openings in the electrolyte layer that may result in ohmic contacts, or short circuits, between the electrodes.

To the extent the electrochemical cell is an electrochromic display device, the electrolyte should preferably be opaque and be able to hide the electrode behind it, from the perspective of the viewer. In essence, this boils down to provide a polyelectrolyte based printable ink, filled with pigment particles. To suit most of the color properties of most electrochromic materials, the pigment should be white.

Compositions comprising polyelectrolytes have been used in printing processes previously. The polyelectrolytes are expected to be sufficiently immobilized not to cause problems with migration. However, electrolytes based on low molecular weight salts, such as ionic liquids, are expected to migrate unless printed in an encapsulated structure, which limits their use. In order to reach a reasonable thickness of the printed electrolyte, at least a few microns, screen printing is suitable. However, when polyelectrolyte solutions are printed, foaming and filament formation often takes place resulting structural defects like pin pinholes, bubbles and other structural defects. The reason behind may be that many polyelectrolyte molecules have hydrophilic ionic groups as well as hydrophobic parts, such as a hydrocarbon polymer backbone, leading to a structure that can stabilize foams. A high molecular weight can also contribute to fiber forming ability which can stabilize filaments. Formation of filaments and foam often take place in printing during the process part where two surfaces wetted by printing ink separate, so called ink-split. In screen printing techniques, there are also several possibilities for phenomenon like foaming as the printing ink is pressed through a fine mesh with plenty of possibilities of the formation of air enclosures.

As for curing the electrolyte print, it is found that that a binder system forming a polymer network upon curing, in reactions not involving the polycations in the composition, by cross-linking a binder system mixed with one or more cationic polymers provides a viable solution for producing a printable electrolyte.

Further, by the electrolyte compositions presented here, a screen printable, opaque, over printable, irradiation curable ink based on a polycation blended with an irradiation curable binder with a low tendency to form foams and filaments is possible.

The electrolyte composition may comprise the following:
a) polyelectrolyte selected from one or more cationic polymers being quaternized nitrogen containing compounds;
b) a solid particulate phase comprising solid particles;
c) a binder system comprising binder molecules and initiator molecules;
d) optionally, a plasticizer;
e) optionally, a processing aid agent; and
f) optionally, a surface active agent, and forms a colloidal dispersion.

In embodiments, the polyelectrolyte does not form part of the binder system.

The binder molecules and initiator molecules may thus be other than the polyelectrolyte. In other words, the binder system may not comprise the polyelectrolyte.

In one example, the electrolyte composition is in form of a colloidal dispersion comprising
a) polyelectrolyte selected from one or more cationic polymers being quaternized nitrogen containing compounds; preferably compounds selected from quaternized polyamines; more preferably compounds selected from polyamines which comprise quaternized amino groups in the polymer backbone, such as ionenes, or polymeric amines with pendant quaternized amino groups; or copolymer of quaternised vinylimidazolium, preferably the copolymer comprises 40-99 mole percent quaternised vinylimidazolium repeating units; or quaternised chitosan;

most preferably the cationic polymer is selected from poly[(3-methyl-1-vinylimidazolium chloride)-co-(1-vinylpyrrolidone)] or poly(diallyldimethylammonium chloride), or a copolymer thereof; more preferably poly(diallyldimethylammonium chloride), or a copolymer thereof; having a molecular weight (Mw) of lower than 100000, such as of between 10000 and 100000, preferably between 20000 and 75000. For example between 20000 and 50000.

b) a solid particulate phase comprising solid particles; having a diameter of between 10 nm to 10 μm;
preferably selected from titanium metal oxide, zinc oxide or plastic material;

c) a binder system comprising binder molecules forming a crosslinked network upon polymerization as well as initiator molecules, where the binder molecules are suitable for irradiation initiated radical polymerization and; selected from mono- or di(meth)acrylic acid ester of homopolymers or copolymers of alkyleneglycol, or mixtures thereof; preferably homo- or copolymers of polyethylene glycol diacrylate, polypropylene glycol diacrylate, polyethylene glycol monoacrylate, polypropylene glycol monoacrylate, or mixtures thereof, and initiator molecules activated by irradiation (i.e. radical initiators); selected from the groups of diaryl- or monoarylketones and phosphine oxides preferably water soluble photoinitiators such as 2-Hydroxy-4'-(2-hydroxyethoxy)-2-methylpropiophenone, and photoinitiators activated by long wavelength light, such as 2,4,6-trimethylbenzoyl diphenyl phosphine oxide; alternatively, the binder system comprises initiator molecules and molecules that can polymerize into cross-linked networks by thiol-ene polymerization where thiols are selected from the group of di-, tri-, or polyfunctional thiols with high boiling boint, preferably trimethylolpropane tris(2-mercaptoacetate), trimethylolpropane tris(3-mercaptopropionate), pentaerythritol tetrakis(3-mercaptopropionate), pentaerythritol tetrakis(2-mercaptoacetate), pentaerythritol tetrakis(3-mercaptobutylate), poly(ethylene glycol)dithiol and ethylene glycol bisthioglycolate; and alkene bearing molecules selected from molecules bearing one or more polymerizable group of methacrylate or allyl type, preferably molecules with solubility in water, such as polyethyeleglycol dimetacrylate, polyethyeleglycol metacrylate, polyethyleneglycol diallyl ether, polyethyleneglycol allyl ether, but also 1,3,5-triallyl-1,3,5-triazine-2,4,6(1H,3H,5H)-trione together with radical initiators activated by irradiation; or selected from the groups of diaryl- or monoarylketones and phosphine oxides preferably water soluble photoinitiators such as 2-hydroxy-4'-(2-hydroxyethoxy)-2-methylpropiophenone, and photoinitiators activated by long wavelength light, such as 2,4,6-trimethylbenzoyl diphenyl phosphine oxide or initiator molecules activated by heat, selected from the group of water soluble thermal initiator molecules such as water soluble azo compounds, hydroperoxides and inorganic peroxides preferably 4,4'-azobis(4-cyanovaleric acid), tert-butyl hydroperoxide, and ammonium-, potassium- or sodiumpersulfate, or selected from mono-difunctional allyl ethers or methacrylic acid esters of polyethylene glycols and d) optionally, a plasticizer; preferably selected from polyalkyleneglycols; preferably selected from polyethyleneglycol, polypropyleneglycol, or mixtures thereof; most preferably poly(ethyleneglycol-ran-propyleneglycol); or selected from hyperbranced polyols or polyglycerols (propane-1,2,3-triol);

e) optionally, a processing aid agent, preferably selected from aliphatic carboxylic acids; most preferably 2-hydroxypropionic acid (DL-lactic acid); and f) optionally, a surface active agent, preferably selected from lecithin and polysorbates; most preferably polyoxyethylene (20) sorbitan monolaurate (Tween 20).

In one example the electrolyte composition comprises about 5 to 65%, by weight of the electrolyte composition (dry content), preferably about 15 to 65% by weight, most preferably about 30 to 60% by weight, of particulate phase (b).

The Polyelectrolyte (a)

The polyelectrolyte is the 'active material' in the composition. The polyelectrolyte has the property to provide ions and ion mobility sufficient for the composition to function as an electrolyte in an electrochemical cell. The polyelectrolyte provides mobile second ions and the whole composition provides mobility for ions to create electrolytic connectivity between the electrodes sandwiching the electrolyte in an electrochemical device. This means that the ion transporting paths in the electrolyte should be sufficient to provide ion transport for the electrochemical switches in the electrodes.

The polyelectrolyte can be selected amongst polycationic materials, like cationic polymers having quaternised nitrogen atoms, for example quaternized ammonium groups.

Example of polyelectrolyte comprising quaternised nitrogen atoms is poly[(3-methyl-1-vinylimidazolium chloride)-co-(1-vinylpyrrolidone)]. Another example is poly(diallyldimethylammonium chloride) (PDADMC-Cl).

The poly[(3-methyl-1-vinylimidazolium chloride)-co-(1-vinylpyrrolidone)] is available as 'Luviquat Excellence™' which is a solution comprising 40 wt % of poly[(3-methyl-1-vinylimidazolium chloride)-co-(1-vinylpyrrolidone)] in water. The poly[(3-methyl-1-vinylimidazolium chloride)-co-(1-vinylpyrrolidone)] is a copolymer having 95 mole % 3-methyl-1-imidazolium chloride repeating units and 5 mole % vinylpyrrolidone units. The product is available from BASF GmbH.

The poly(diallyldimethylammonium chloride) is typically used as a water solution comprising 35 wt. % poly(diallyldimethylammonium chloride). The polycationic polyelectrolyte is available from Sigma Aldrich.

The polyelectrolyte cationic polymers having quaternised nitrogen atoms may be present in an amount of between 15 and 65% by weight, preferably in an amount of 10 to 25% by weight (dry content), preferably of about 20% by weight (dry content).

The Solid Particulate Phase (b)

The electrolyte composition described herein comprises a solid particulate phase. The solid particulate phase is present for the purpose to provide a cationic polyelectrolyte stable against interruption, pin-holes and cracks.

The solid particulate phase shall be present in an amount of 5 to 65%, by weight, of the electrolyte composition (dry content), for example, in an amount of about 5 to 40% by weight. Preferably, the electrolyte composition comprises the solid particulate phase in an amount of about 15 to 65% by weight, more preferably about 30 to 60% by weight.

Examples are between 40 to 60% by weight, another example is between 50 to 55% by weight. Further examples, the electrolyte composition comprises a solid particulate phase in an amount of 5, 10, 15, 20, 25, 30, 35, 40, 45, 50, 55, 60, or 65% by weight.

The size (e.g. the average diameter) of the particles in the solid particulate phase shall be between 1 nm and 10 µm, for example between 0.1 µm and 5 µm, for example particles of about 0.3 µm or about 0.4 µm (average size). The median particle size may be 0.36 µm.

The solid particulate phase may consist of a solid particulate phase comprising solid particles being inert to the other components included in the electrolyte composition, and substantially not electronical conductive. For example, the solid particulate phase may consist of particulate pigment. The pigment present in the composition may prevent the electrolyte from being transparent so the equipment underneath, such as the electrodes, is concealed. By this a maximum contrast may be obtained for a vertical electrochrome display. Examples of particulate formed pigment are white titanium oxide ($TiO_2$) pigment, Kronos 2300, available from Kronos AS, Norway. Another example is particles of zinc oxide (ZnO). The solid particulate phase may also consist of plastic material, for example of polymethyl methacrylate (PMMA), available as crosslinked plastic particles, Spheromers® from Microbeads AS. Also mixtures of solid particles may be included, thus the solid particulate phase may comprise particles of pigment and particles of plastic material.

The solid particulate phase (b) forms a colloid in the polyelectrolyte composition. The solid particles are able to destabilize filaments, films and foams, and are also able to prevent the formation of such structures. Although the solid particles may provide a mechanical strength to the cross-linking polymer, forming the binder system when it is cured and dried, the particulate phase is not considered primarily as the binder in the electrolyte composition or the cured electrolyte layer. Further, the polycation in itself can add strength to the material after the film is dried from water. However, a simple binary mix of the polycation and solid particles is not be considered as immobilized here, even if they would form a solid dry film, since if it would be immersed in water, the polycation would be dissolved and the binary composition would disintegrate. In addition to destabilize foams and filaments, the solid particle can have other functions such as modifying the optical properties, for example to make the electrolyte layer opaque, or as particles releasing agents in a controlled manner after deposition or solids binding water.

the Binder System (c)

With the binder system (c) it is herein meant the binder molecules, i.e. the polymerizable molecules and the initiator molecules for a polymerization reaction. By the polymerization reactions is a network of the binder molecules formed to provide physical integrity of the cured film. The objective of the binder system is not to bind polyelectrolyte molecules chemically, for example covalently, but to reduce their mobility in the binder network formed by the binder molecule.

The electrolyte composition may comprise the binder system in an amount of 5 to 10% by weight (dry content).

The polymeric binder, thus the binder molecule, included in the binder system shall have at least one polymerizable sites, or polymerizable group(s).

Further as the binders are to exist in an electrolyte, they should preferably be able to dissolve and transportions between the electrodes in the electrochemical device.

The binder system can be a typical 'UV-curing system' based on molecules with polyfunctional and monofunctional acrylates or methacrylates, radical photoinitiators, and, optionally, co-initiators.

Example is monoacrylates. The polymer may also comprise monomers having two or more functional groups, sites for the polymerization. Further examples of such polymers are di- and polyacrylates, preferably polyethyleneglycol diacrylate.

Typically the binder molecules are selected from the following groups of polymers or copolymers: poly(ethyleneglycol)diacrylate, poly(propylene glycol)diacrylates, and poly(ethyleneglycol)monoacrylates, poly(propyleneglycol)monoacrylates, or mixtures thereof. Examples of such binders are polyethyleneglycol diacrylate, Mn 700 (PEG-diacrylate 700).

The binder system can also be based on thiol-ene chemistry, thus molecules having double bonds and thiol groups, and an initiator molecule, for example a radical photoinitiator. Thiol-ene reactions can give a high monomer conversion and a high degree of polymerization even if the curing is carried out in air and the monomer concentration is low.

The binder system consists of molecules able to form a polymeric network, i.e. the binder molecules, after print deposition to provide cohesive and adhesive strength and integrity to the system. The binder system may comprise one or more binder molecules and one or more initiator molecules for forming the polymeric network including the polyelectrolyte and the solid particulate phase. The binder molecules and the binder system may be curable after the initiation by for example ultraviolet radiation, which initiates the cross-linking, networking reaction.

The polyelectrolyte composition may comprise one or more photoinitiators. These are typically added together with the binder system. The photoinitiators have the ability to initiate a polymerization upon irradiation, thus to cure the polyelectrolyte composition.

Further, the photoinitiator is initiated at a specific wave length, by mixing two or more photoinitiators, being initiated at different wave lengths, the range of wave lengths at which the photoinitiator is activated, and the polyelectrolyte cured, may be broadened.

The photoinitiator, one or more, should preferentially be compatible with all materials in the composition. This means that they should function in composition filled with white pigment particles, meaning that they should initiate in light that are transmitted through such particle dispersion. Further, water may be present in the composition, and all components are to some extent soluble in water, therefore a certain distribution of photoinitiator in water is desirable. UV-curing of printed electrolytes being opaque can be challenging, especially for photoinitiators absorbing at short wavelengths. In the case of white pigments, the light is scattered through the material. For good bulk curing, needed to obtain good cohesion and adhesion to the underlying material, one can use a photoinitiator absorbing at long wavelengths that can pass the pigment filled material.

Examples of photoinitiators are Irgacure 2959, (2-Hydroxy-4'-(2-hydroxyethoxy)-2-methylpropiophenone) 98%, purchased from Sigma Aldrich; Esacure ONE™, which is a difunctional-α-hydroxy ketone, available from Lamberti SA. Esacure is a photoinitiator showing high reactivity which may be an advantage when curing the electrolyte. Another example is 2,4,6-trimethylbenzoyl diphenyl phosphine oxide, 'Lucirin TPO', available from BASF.

The polyelectrolyte composition may contain the initiator in an amount of 0.1 to 2% by weight (dry content).

Alternatively, the binder system can contain binder molecules forming a network by so called thiol-ene chemistry. In thiol-ene curing systems, molecules having multiple bonds and molecules having thiol groups forms a network by forming sulfide bonds in a radical reaction as the main reaction path. The molecules taking part in the polymerization reaction, typically have two or more functional groups, double bonds and thiols, respectively. Examples of suitable molecules with double bonds are polyethyeleglycol dimetacrylate, polyethyeleglycol metacrylate, polyethyleneglycol diallyl ether, polyethyleneglycol allyl ether, and 1,3,5-triallyl-1,3,5-triazine-2,4,6(1H,3H,5H)-trione.

Examples of suitable di- and polyfunctional thiols are trimethylolpropane tris(2-mercaptoacetate), trimethylolpropane tris(3-mercaptopropionate), pentaerythritol tetrakis(3-mercaptopropionate), pentaerythritol tetrakis(2-mercaptoacetate), pentaerythritol tetrakis(3-mercaptobutylate), poly(ethylene glycol)dithiol and ethylene glycol bisthioglycolate.

Alternatively, the binder system may comprise one or more binders which are curable upon thermal treatment.

Plasticizer (d)

A plasticizer (d) may optionally be added to the electrolyte composition to provide flexibility to the cured film. A plasticizer is used to maintain and enhance the printing quality as it helps the electrolyte to flow better through the screen mesh and to give a smoother surface layer of the electrolyte. In a humid environment, the polyelectrolyte absorbs water molecules that have a plasticizing effect on the contents of the printed and cured composition. In absence of water, and at low humidity the film can become hard and lose its ability to transportions. An added plasticizer may provide flexibility to such a film.

The plasticizer may be selected from a flexible polyether, a polyol, such as polyglycerol, or a fluid hyperbranched polyol.

Typically the plasticizer to be included in the polyelectrolyte composition is a co-polymer comprising polyethylene glycol (PEG) and polypropylene glycol. An example of plasticizer is poly(ethyleneglycol-ran-propyleneglycol), Mn 12000. Other examples of plasticizers are hyperbranched polyols, such as polyalcohols polymerized with 2,2-dimethylol propionic acid, available as Boltorn® P500 or Boltorn® H2004 by Perstorp, or diglycerol or polyglycerol-3 from Solvay Chemical, or triglycerol.

The plasticizer may be partially soluble in the water phase.

The electrolyte composition may comprise plastizicer in an amount of between 3 to 8% by weight (dry content).

Processing Aid Agent (e)

The electrolyte composition may also comprise one or more processing aid agent to make the composition more stable resistible during its processing, for example during further treatment like elevated temperature. The processing aid agent may make the composition to stand the treatment without disruption or cracking. Typically, the electrolyte composition may endure thermal treatment of up to 140° C. for several minutes. The processing aid agent keeps the surface layer intact during the heat treatment. An example of agents is a dispersing aid which may be optionally added to keep the solid particles dispersed under dry conditions, thus when the water has been evaporated. The particles may be well dispersed in water, but as the film is processed at high temperature and water evaporates, particles can form aggregates which can lead to disintegration of the film unless a dispersing agent with a low volatility is present. Examples of dispersing aids having this purpose are aliphatic carboxylic acids. Preferably, the acid has a low melting point, in combination with a high boiling point. More specifically the processing aid agent may be 2-hydroxypropionic acid, in its DL-form, also denoted DL-lactic acid. This lactic acid has a melting point of −53° C. and boiling point of 122° C., at 12 mm Hg. The dispersing aid may prevent that the solid particles aggregate causing the coating to form cracks.

The electrolyte composition may comprise the processing aid agent in an amount of between 6 to 14% by weight (dry content).

Surface Active Agent

Another optional component of the electrolyte composition is the surface active agent. The surface agent may be present in an amount of 0.1 to 2% by weight (dry content). The surface active agent may be selected from lecithin and polysorbates. Example of polysorbates is polyoxyethylen (20) sorbitan monolaurate (Tween 20).

Dispersing Medium

The electrolyte composition in form of a colloid comprises also a dispersing medium, thus a liquid. Depending on the components included in the polyelectrolyte composition, the liquid may be selected from water or solvents, or mixture thereof. Typically, the liquid is aqueous liquids, for example water, or water mixed with lower alcohols, for example ethanol.

An additional example of the electrolyte composition is an electrolyte composition comprising (in % by weight (dry content)):
the polyelectrolyte poly[(3-methyl-1-vinylimidazolium chloride)-co-(1-vinylpyrrolidone)] (Luviquat Excellence) in an amount of 15-65% by weight;
a solid particulate phase comprising titanium dioxide, in an amount of 15-65% by weight;
a binder system comprising poly(ethylene glycol)diacrylate (PEG-diacrylate (700)) as binder molecule, in an amount of 5-25% by weight;
the iniator(s) Irgacure and lucerin-TPO in an total amount of 0.1-5% by weight;
2-hydroxypropionic acid (DL-lactic acid) as processing aid agent, more specifically, as dispersing aid, in an amount of 5-35% by weight; and poly(ethylene glycol-ran-propylene glycol) as a plasticizer in an amount of 1-30% by weight; and with water as dispersing medium.

An additional example of the electrolyte composition is an electrolyte composition comprising (in % by weight (dry content)):
the polyelectrolyte poly[(3-methyl-1-vinylimidazolium chloride)-co-(1-vinylpyrrolidone)] (Luviquat Excellence) in an amount of about 23% by weight (dry content);
a solid particulate phase comprising titanium dioxide, in an amount of about 54% by weight;
a binder system comprising poly(ethylene glycol)diacrylate (PEG-diacrylate (700)) as binder molecule, in an amount of about 6% by weight;
the iniator(s) Irgacure and lucerin-TPO in an total amount of about 0.8% by weight;
2-hydroxypropionic acid (DL-lactic acid) as processing aid agent, more specifically, as dispersing aid, in an amount of about 11% by weight; and
poly(ethylene glycol-ran-propylene glycol) as a plasticizer in an amount of about 5% by weight; and with water as dispersing medium.

An additional example of the electrolyte composition is an electrolyte composition comprising (in % by weight (dry content)):
the polyelectrolyte poly(diallyldimethylammonium chloride) (PDADMA-Cl) in an amount of 15-65% by weight;
a solid particulate phase comprising titanium dioxide, in an amount of 15-65% by weight;

a binder system comprising poly(ethylene glycol)diacrylate (PEG-diacrylate (700)) as binder molecule, in an amount of 5-25% by weight; the intiator(s) Irgacure and lucerin-TPO in an total amount of 0.1-5% by weight;
the processing aid agent, or dispersing aid DL-lactic acid in an amount of 5-35% by weight.
2-hydroxypropionic acid (DL-lactic acid) as processing aid agent, more specifically, as dispersing aid, in an amount of 5-35% by weight; and
poly(ethylene glycol-ran-propylene glycol) as a plasticizer in an amount of 1-30% by weight; and with water as dispersing medium.

An additional example of the electrolyte composition is an electrolyte composition comprising (in % by weight (dry content)):
the polyelectrolyte poly(diallyldimethylammonium chloride) (PDADMA-Cl) in an amount of about 21% by weight;
a solid particulate phase comprising titanium dioxide, in an amount of about 55% by weight;
a binder system comprising poly(ethylene glycol)diacrylate (PEG-diacrylate (700)) as binder molecule, in an amount of about 6% by weight;
the iniator(s) Irgacure and lucerin-TPO in an total amount of about 0.8% by weight;
2-hydroxypropionic acid (DL-lactic acid) as processing aid agent, more specifically, as dispersing aid, in an amount of about 11% by weight; and
poly(ethylene glycol-ran-propylene glycol) as a plasticizer in an amount of about 6% by weight; and with water as dispersing medium.

The Method

The method of preparing the electrolyte composition comprises following steps:
a) providing a solution comprising a polyelectrolyte;
b) dispersing a solid particulate phase in the polyelectrolyte solution provided in step a), for example by using a mechanical treatment in a mechanical homogenizer;
c) providing a binder system wherein the binder molecules are dissolved in a solution, optionally comprising initiator molecules, typically a photoinitator; and
d) mixing the dispersion of polyelectrolyte and solid particulate phase provided in step b) with the solution of step c) comprising the binder system, and, also other optional components like processing aid agents, plasticizer and surface active agent. The mixing may be a mechanical mixing in, for example, a homogenizer. Also mixing by sonication may be applicable.

Typically, the method of preparing the electrolyte composition comprises following steps:
a) providing a solution comprising polyelectrolyte, preferably an aqueous solution;
b) dispersing a solid particulate phase in the polyelectrolyte solution provided in step a), for example by using a mechanical treatment, such as a mechanical homogenizer;
c) providing a binder system dissolved in a solution comprising binder molecules and photoinitiators; and
d) mixing the dispersion of polyelectrolyte and solid particulate phase provided in step a) with the solution of step b) comprising the binder system, and also the other components. The mixing may be a mechanical mixing in, for example, a homogenizer.

The polyelectrolyte may be present in an amount of 15-65% by weight; the binder system in an amount of 5-25% by weight; one or more photoiniator(s) in an amount of 0.1-5% by weight; processing aid agent in an amount of 5-35% by weight; the plasticizer in an amount of 1-30% by weight.

The layers of electrolyte composition may have a thickness of between 0.5 µm and 50 µm, for example between 1 µm and 30 µm, or between 5 µm and 15 µm. Preferably, the electrolyte composition is deposited with a thickness of about 10 µm.

By the method it is possible to deposit an even film substantially without pin-holes or cracks. Further, a higher density of the after the curing may be obtained if the electrolyte layer, comprising pigment, is applied as thin layers.

The Electrode

The electrode may be applied upon the substrate, is herein denoted as the 'first electrode', and upon the electrolyte, herein denoted the 'second electrode'. Examples of printable electrode materials that can be used to build electrochemical cells with the printable electrolyte composition are Clevios S V3™, a screen printable electrochromic material based on poly(3,4-ethylenedioxythiophene) poly(styrenesulfonate) (PEDOT:PSS) (provided by Heraeus) and a carbon based printable conductor (DuPont 7102, provided by DuPont).

The electrolyte may be printed using a range of printing methods including flexo, screen, offset and gravure printing. Screen printing is particularly preferred.

EXAMPLES

Example 1

Binder Solution

A solution was prepared by dissolving 1 g Irgacure 2959, 0.8 g Lucerin-TPO in 14 g polyethyleneglycol diacrylate 700, all ingredients purchased from Sigma-Aldrich, under heat and absence of light. The solution was cooled to ambient temperature.

Example 2

A printable polyelectrolyte based on poly[(3-methyl-1-vinylimidazolium chloride)-co-(1-vinylpyrrolidone)] (Luviquat Excellence) 120 g titanium dioxide, Kronos 2300, (median particle size 0.36 µm) purchased from Kronos AS, Norway, is dispersed for 20 minutes in 130 g of a 40% aqueous solution of Luviquat Excellence, purchased from BASF GmbH, Germany, with the aid of 28 g deionized water using a Yellow Line Laboratory mixer from ATP Engineering B. V., equipped with a 70 mm rotor-stator high shear inline mixer. The binder solution prepared according to example 1 was added. Subsequently 12 g poly(ethyleneglycol-ran-propyleneglycol), and 24 g of DL-lactic acid, both purchased from Sigma-Aldrich were added. The mixture was homogenized using the inline shearing mixer for 10 minutes.

Example 3

A printable polyelectrolyte based on poly(diallyldimethylammonium chloride), (PDADMA-Cl)
120 g titanium dioxide, Kronos 2300, was dispersed for 20 minutes in 130 g of a 35% aqueous solution PDADMA-Cl, (labeled 'very low molecular weight'Mw<100 000 g/mol), purchased from Sigma-Aldrich using the mixing equipment as described in example 2. The binder solution prepared according to example 1 was added. Subsequently 12 g poly (ethyleneglycol-ran-propyleneglycol) and 24 g DL-lactic acid were added. The mixture was homogenized using the inline shearing mixer for 15 minutes.

Example 4

A printable polyelectrolyte composition with an amine synergist 120 g titanium dioxide Kronos 2300 is dispersed for 20 minutes in 130 g of Luviquat Excellence with the aid of 28 g deionized water using the in-line high shear mixer. The binder solution prepared in example 1 was added. Subsequently 12 g poly(ethyleneglycol-ran-propyleneglycol), 24 g lactic acid and 3.5 g of an amine synergist, Sartomer CN 3755, purchased from Sartomer SA were added to inhibit oxygen termination during curing with ultraviolet initation and irradiation. The mixture was homogenized with the inline shearing mixer for 10 minutes.

Example 5

A printable polyelectrolyte based on poly[(3-methyl-1-vinylimidazolium chloride)-co-(1-vinylpyrrolidone)] (Luviquat Excellence) and lecithine.

A binder solution was prepared according to the procedure in example 1, from 6.98 g Irgacure 2959, 4.95 g Lucerin-TPO in 79.81 g polyethyleneglycol diacrylate 700. To this binder solution was added 750.3 g of a 40% aqueous solution of Luviquat Excellence, followed by mixing using a Yellow Line Laboratory mixer from ATP Engineering B.V., equipped with a 70 mm rotor-stator high shear inline mixer. To 82.33 g of the mixture was 6.35 g poly(ethyleneglycol) 400 added. The mixture was homogenized using the inline shearing mixer for 10 minutes.

Example 6

62.1 g of the electrolyte composition described in example 2 is mixed with 1.0 g of pentaerytritol tetrakis(3-mercapto propionate).

Example 7

Printing of electrochromic test structures using the electrolyte composition in example 2. A first electrode pattern of PEDOT:PSS, Clevios SV-3, purchased from Clevios GmbH, was screen printed on a transparent plastic substrate (1040) using a 120-34 mesh web. Subsequently, the electrolyte pattern is printed, using the composition as in Example 2, and cured twice to give a double layer of the electrolyte (1030) described in Example 2. The electrolyte pattern is printed with a 120-34 mesh web and UV cured (Aktiprint T28-1 UV dryer with belt speed setting of 30% of maximum speed). The second electrode pattern (1020) is printed using 7102, a carbon based conducting ink purchased from DuPont, and thermally cured at 140° C. for three minutes. A drawing of the electrocromic test-structures printed as described in example 7 is shown in FIG. 8. First, an electrochromic electrode pattern 1010 is printed on a transparent plastic substrate. Then the electrolyte layers are printed on a portion of the substrate 1040 and a portion of the electrochromic pattern 1010. (Provided a sufficient amount of white pigment is provided to the composition, it is non transparent white in the resulting device)). Finally, the second electrode pattern 1020 is printed on top of the electrolyte.

Example 8

Printing of electrochromic test structures using electrolyte ink in example 3. The procedure in example 5 is followed except that the electrolyte composition in Example 3 is used.

Example 9

Printing of electrochromic test structures using electrolyte ink in example 4. The procedure in example 7 is followed except that the electrolyte composition in example 4 is used.

Example 10

Figure 10:
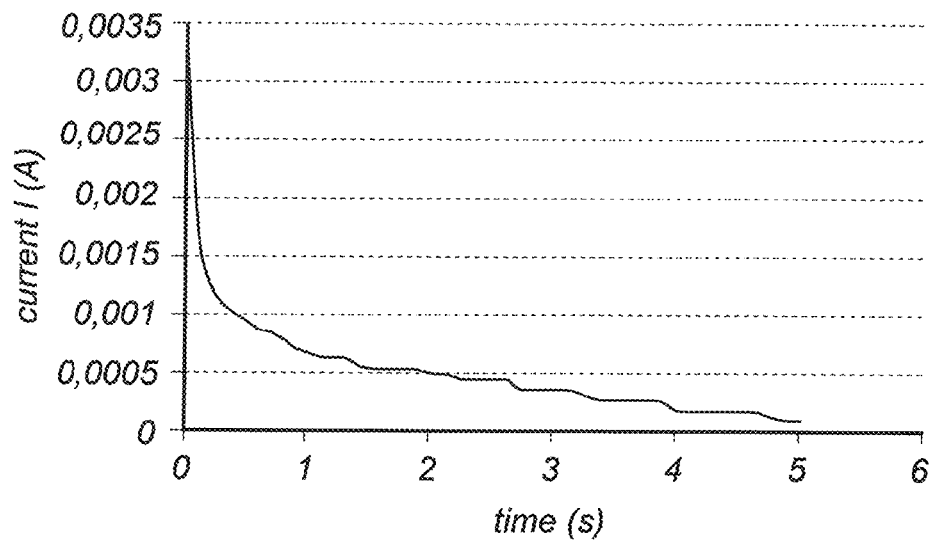
FIG. 10 is a graph showing the current flowing through the test pixel versus time after applying the voltage of 3V.

Testing of the printed electrochromic display pixel in example 5. A test pixel was cut out from the test-structure printed in example 5. The electrodes were connected to a voltage source so that the electrochromic PEDOT:PSS electrode was connected to the negative pole and the carbon electrode connected to the positive pole. After the voltage is applied, the current is plotted versus elapsed time. The electrochromic PEDOT:PSS pixel turns deep blue as it is reduced during the switch. The voltage used here was 3 V. In FIG. 9a it is shown a test pixel to be cut out from the test-structure depicted in FIG. 8a, and in FIG. 9c if is shown before switching (white). In FIG. 9d, the pixel can be seen after switching the pixel (shadowed) as described in example 10. In FIG. 10 the curve obtained when the current flowing through a test pixel is plotted against time after applying 3 V over the electrodes according to example 10. Ocularly, the pixel appears to be switched after circa one second.

Example 11

Figure 11:
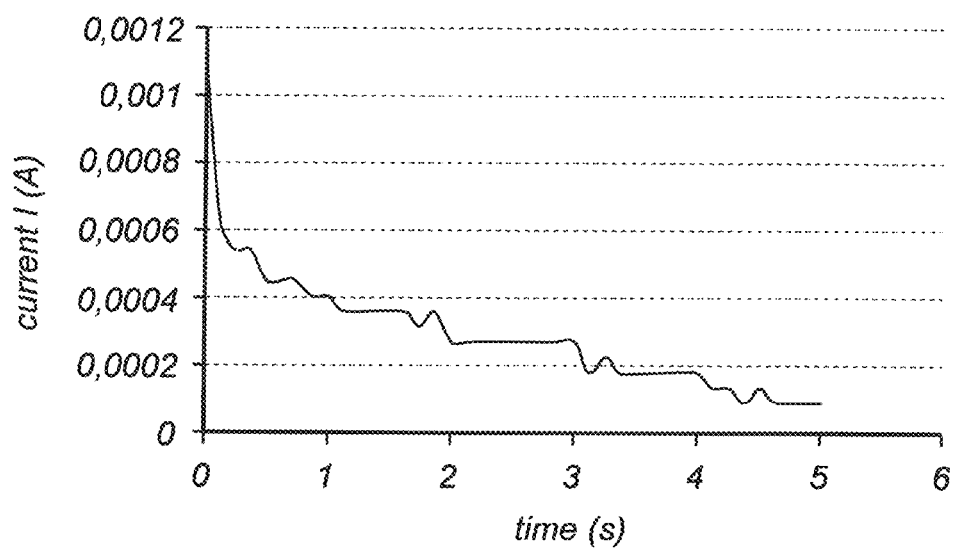
FIG. 11 is a graph shown the current flowing through the test pixel versus time after applying the voltage of 3V.

Testing of the printed electrochromic display pixel in example 8. A test pixel, as an electrochemical cell (1001), was cut out from the test-structure printed in example 9 and tested as described in example 10. In FIG. 11 the curve obtained when the current flowing through a test pixel is plotted against time after applying 3V over the electrodes according to example 11. Ocularly, the pixel appears to be switched after circa one second.

While the invention has been described with reference to a number of preferred embodiments, it will be understood by those skilled in the art that various changes may be made and equivalents may be substituted for elements thereof without departing from the scope of the invention. In addition, many modifications may be made to adapt a particular form or material to the teachings of the invention without departing from the essential scope thereof. Therefore, it is intended that the invention not be limited to the particular embodiments disclosed for carrying out the invention, but the invention will include all embodiments falling within the scope of the appended claims.

Embodiments of the Electrolyte

Embodiment 1

An electrolyte composition in form of a colloidal dispersion comprising
a) polyelectrolyte selected from one or more cationic polymers being quaternized nitrogen containing compounds;
b) a particulate phase comprising solid particles; preferably having a diameter of between 1 to 10000 nm;
c) a binder system comprising binder molecules;
d) optionally, a plasticizer;
e) optionally, a processing aid agent, and
f) optionally, a surface active agent.

Embodiment 2

An electrolyte composition according to embodiment 1, wherein the polyelectrolyte does not form part of the binder system.

Embodiment 3

A electrolyte composition in form of a colloidal dispersion comprising according to embodiments 1 or 2, wherein the a) polyelectrolyte is selected from one or more cationic polymers being quaternized nitrogen containing compounds;
preferably compounds selected from quaternized polyamines; more
preferably compounds selected from polyamines which comprise quaternized amino groups in the polymer backbone, such as ionenes, or polymeric amines with pendant quaternized amino groups; or copolymer having quaternised vinylimidazolium repeating units, preferably the copolymer comprises 40-99 mole percent quaternised vinylimidazolium repeating units; or quaternised chitosan;
more preferably the cationic polymer is selected from poly[(3-methyl-1-vinylimidazolium chloride)-co-(1-vinylpyrrolidone)] or
poly(diallyldimethylammonium chloride), or copolymer thereof; most preferably the cationic polymer is selected from poly(diallyldimethylammonium chloride), or copolymer thereof, having a molecular weight (Mw) of lower than 100000, preferably between 10000 and 100000; more preferably between 20000 and 75000.
  b) a particulate phase comprising solid particles; preferably having a diameter of between 10 nm to 10 μm; preferably selected from titanium oxide, zinc oxide, plastic material, or mixtures thereof;
  c) a binder system comprising binder molecules forming a crosslinked network upon polymerization together with initiator molecules where the binder molecules are suitable for irradiation initiated radical polymerization;
  d) optionally, a plasticizer; preferably selected from polyalkyleneglycols; preferably selected from polyethyleneglycol, polypropyleneglycol, or mixtures thereof; more preferably poly(ethyleneglycol-ran-propyleneglycol); or selected from hyperbranced polyols or polyglycerols (propane-1,2,3-triol);
  e) optionally, a processing aid agent, preferably selected from aliphatic carboxylic acids; most preferably 2-hydroxypropionic acid (DL-lactic acid); and
  f) optionally, a surface active agent, preferably selected from lecithin and polysorbate(s).

Embodiment 4

An electrolyte composition according to any of embodiments 1 to 3 wherein the amount of solid particulate phase is 15 to 65% by volume of the electrolyte composition (dry content).

Embodiment 5

An electrolyte composition according to any of embodiments 1 to 4 comprising (as dry content)
a polyelectrolyte in an amount of 10 to 65% by weight; preferably in an amount of 10 to 25% by weight, preferably 20% by weight;
a solid particulate phase in an amount of 15-65% by weight; preferably in an amount of 40 to 60% by weight, more preferably of 50 to 55% by weight;
a binder system comprising a binder molecules in an amount of 5-25% by weight; preferably in an amount of 5 to 10% by weight, and one or more initiator(s) in an amount of 0.1-5% by weight; preferably of 0.1 to 2% by weight;
a processing aid agent in an amount of 5-35% by weight; preferably in an amount of 6 to 14% by weight;
a plasticizer in an amount of 1-30% by weight; preferably in an amount of 1 to 10% by weight, more preferably in an amount of 3 to 8% by weight; and a surface active agent in an amount of 0.1 to 2% by weight.

Embodiment 6

An electrolyte composition according to any of embodiments 1 to 5, wherein the polyelectrolyte comprises quaternized polyamine; preferably poly(diallyldimethylammonium chloride) (PDADMA-Cl), or copolymer thereof; more preferably poly(diallyldimethylammonium chloride) (PDADMA-Cl), or copolymer thereof having a molecular weight (Mw) of less than 100000.

Embodiment 7

An electrolyte composition according to any of embodiments 1 to 5, wherein the polyelectrolyte is a copolymer having quaternised vinylimidazolium repeating units, preferably the copolymer comprises 40-99 mole percent quaternised vinylimidazolium repeating units; preferably the polyelectrolyte is poly[(3-methyl-1-vinylimidazolium chloride)-co-(1-vinylpyrrolidone)].

Embodiment 8

An electrolyte composition according to any of embodiments 1 to 7, wherein the binder system comprises one or more binder molecules selected from
polymerizable substances forming a crosslinked network upon polymerization; preferably selected from mono- or di(meth)acrylic acid ester of homopolymers or copolymers of alkyleneglycol, or mixtures thereof;
preferably homo- or copolymers of poly(ethylene glycol) diacrylate, poly(propylene glycol)diacrylate, poly(ethylene glycol)monoacrylate, poly(propylene glycol)monoacrylate, or mixtures thereof; more preferably selected from mono- or difunctional allyl ethers or methacrylic acid esters of polyethylene glycols and polyfunctional mercaptanes; preferably homo- or copolymers of poly(ethylene glycol)diacrylate, poly(propylene glycol) diacrylate, poly(ethylene glycol) monoacrylate, poly(propylene glycol)monoacrylate, or mixtures thereof;

Embodiment 9

An electrolyte composition according to embodiment 1 or 8, wherein the particulate phase comprises pigment particles, preferably the pigment is titaniumdioxide ($TiO_2$) pigment particles or zinc oxide (ZnO) pigment particles.

Embodiment 10

An electrolyte composition according to any of embodiments 1 to 9, wherein a processing aid agent is added, preferably the processing aid agent is lactic acid, more preferably DL-lactic acid.

Embodiment 11

An electrolyte composition according to any of embodiments 1 to 10, comprising a surface active agent, preferably the surface active agent is lecithin or a polysorbate.

Embodiment 12

An electrolyte composition according to any of embodiments 1 to 11, for screen printing, flat-bed printing or rotary printing.

Embodiment 13

Method of preparation of an electrolyte composition as defined in any of embodiments 1 to 12, comprising following steps:
a) providing a solution comprising polyelectrolyte;
b) dispersing the solid particulate phase in the polyelectrolyte solution provided in step a);
c) providing a binder system dissolved in a solution comprising binder molecules and initiator molecules, and
d) mixing the dispersion of polyelectrolyte and solid particulate phase provided in step b) with the solution of step c) comprising the binder system.

While the invention has been described with reference to a number of preferred embodiments, it will be understood by those skilled in the art that various changes may be made and equivalents may be substituted for elements thereof without departing from the scope of the invention. In addition, many modifications may be made to adapt a particular form or material to the teachings of the invention without departing from the essential scope thereof. Therefore, it is intended that the invention not be limited to the particular embodiments disclosed for carrying out the invention, but the invention will include all embodiments falling within the scope of the appended claims. It is further noted that, in the claims, the word "comprising" does not exclude other elements or steps, and the indefinite article "a" or "an" does not exclude a plurality. A single apparatus or other unit may fulfil the functions of several items recited in the claims. The mere fact that certain features or steps are recited in mutually different dependent claims does not indicate that a combination of these features or steps cannot be used to advantage.

The invention claimed is:

1. A part for a directly addressable display device comprising at least one pixel cell, each pixel cell being arranged for displaying a symbol, which symbol is repeatedly switchable between an on-state and an off-state, wherein each pixel cell comprises:
an electrically conducting electrochromic layer comprising electrochromic and electrochemically active organic polymer material being electrochemically switchable between two different visually detectable colouring states;
a counter electrode layer comprising an electronically conductive material, wherein said counter electrode layer in a viewing direction is arranged behind said electrochromic layer;
an electrolyte layer, which electrolyte layer is solidified and arranged spatially between, and in ionic contact with, said electrochromic layer and said counter electrode layer;
wherein
each pixel cell further comprises a symbol defining layer which is electronically and ionically insulating, arranged in direct ionic contact with said electrochromic layer, and which symbol defining layer comprises one or more openings which encloses said electrolyte layer and defines the shape of said symbol;
said electrolyte layer, between said symbol defining layer and said counter electrode layer, covers and extends to the side of said one or more openings of the symbol defining layer; and
said electrolyte comprises a composition comprising:
a) a polyelectrolyte selected from one or more cationic polymers, wherein the electrolyte is substantially free of small cations.

2. A part for a directly addressable display device according to claim 1, wherein each counter electrode layer is connectable by a separate electric conductor to an external power supply, to enable individual control of the potential applied to each counter electrode layer.

3. A part for a directly addressable display device according to claim 1, wherein said at least one pixel cell is free of any electrodes arranged in front of said one or more openings and in front of said electrochromic layer as seen in the viewing direction.

4. A part for a directly addressable display device according to claim 1, wherein said at least one pixel cell is free of any electrodes arranged behind the counter electrode layer as seen in the viewing direction.

5. A part for a directly addressable display device according to claim 4, wherein said electrochromic layer continuously extends between adjacent pixel cells.

6. A part for a directly addressable display device according to claim 1, wherein the display device comprises at least two pixel cells, where said electrolyte layer is ionically separated between adjacent pixel cells and said counter electrode layer is electronically separated between adjacent pixel cells.

7. A part for a directly addressable display device according to claim 1, wherein said symbol defining layer is continuous and comprises openings forming said symbols.

8. A part for a directly addressable display device according to claim 1, wherein said counter electrode layer comprises electrically conductive carbon.

9. A part for a directly addressable display device according to claim 1, wherein the colour of the electrolyte layer and the colour of the symbol defining layer are substantially the same, such that a visual appearance of the display in the off state results in that the symbols to be displayed are less discernable compared to if the colour of the electrolyte layer and the colour of the symbol defining layer were substantially different.

10. A part for a directly addressable display device according to claim 1, wherein said display device is a fixed image display device which is arranged to display at least two symbols having different shapes.

11. A directly addressable display device comprising:
a part for a directly addressable display device according to claim 1; and
connectors arranged to receive a power supply;
wherein the counter electrode layer of the part for a directly addressable display device is electrically connected by a separate electric conductor to the connectors arranged to receive said power supply to enable individual control of the potential applied to the counter electrode layer.

12. Operation of a directly addressable display device according to claim 11 further comprising a power supply electrically connected to said connectors arranged to receive a power supply, comprising the step of providing an electric potential difference between said electrochromic layer and said counter electrode layer, which electric potential difference causes coloration upon reduction of said electrochromic layer.

13. A directly addressable display device comprising:
- a part for a directly addressable display device according to claim 1;
- an addressing circuit; and
- connectors arranged to receive a power supply, which connectors are electrically connected to said addressing circuit; and wherein the counter electrode layer of the part for a directly addressable display device is electrically connected by a separate electric conductor to the addressing circuit to enable individual control of the potential applied to the counter electrode layer.

14. Use of an electrolyte and a symbol defining layer for confining the electrochemical reaction in a part for a directly addressable display device arranged according to claim 1, which electrolyte is a polycationic electrolyte comprising cations having a molecular weight distribution wherein less than 20 wt %, or less than 15 wt % or less than 10 wt % or less than 5 wt % or less than 3 wt % of the cations have a molecular weight lower than 1 000 g/mole.

15. A method of producing a part for a directly addressable display device arranged to selectively display at least one symbol, which symbol is repeatedly switchable between an off-state and an on-state, comprising the steps of:
- providing an electrochromic layer carried by a transparent plastic substrate, wherein said electrochromic layer comprises electrochromic and electrochemically active organic polymer material being electrochemically switchable between different visually detectable colouring states;
- selecting active portions of said electrochromic layer;
- providing an electrolyte solution;
- printing an electrolyte layer directly on said active portions of said electrochromic layer using an electrolyte composition, wherein each portion of the electrolyte layer which is arranged in ionic contact with one active portion of the electrochromic layer, and arranged spatially separated from a portion of the electrolyte which is in ionic contact with any other active portion of the electrochromic layer;
- printing a counter electrode layer on top of and in direct ionic contact with said electrolyte layer at each active portion of the electrochromic layer;

wherein said step of providing an electrolyte composition comprises providing an electrolyte composition comprising
a) a polyelectrolyte selected from one or more cationic polymers, wherein the electrolyte is substantially free of small cations,
b) a particulate phase forming a colloidal dispersion of the electrolyte composition,
c) a binder system forming a cross-linked network; and
wherein the step of selecting active portions of said electrochromic layer further comprises printing a symbol defining layer directly on said electrochromic layer, which symbol defining layer encloses said active portions of said electrochromic layer and defines the respective shape of said at least two symbols.

16. A method according to claim 15, wherein said step of printing a symbol defining layer further comprises the step of providing a continuous symbol defining layer comprising openings forming said at least two symbols.

17. A method according to claim 16, wherein the step of printing an electrolyte layer further comprises the step of printing the electrolyte layer between said symbol defining layer and said counter electrode layer such that the electrolyte layer covers and extends to the side of the one or more openings of the symbol defining layer.

* * * * *